US012015333B2

(12) United States Patent
Gerçek et al.

(10) Patent No.: US 12,015,333 B2
(45) Date of Patent: Jun. 18, 2024

(54) INTELLIGENT DISCHARGE CONTROL FOR MODULAR MULTILEVEL CONVERTER

(71) Applicant: VESTAS WIND SYSTEMS A/S, Aarhus N (DK)

(72) Inventors: Cem Özgür Gerçek, Risskov (DK); Lars Helle, Suldrup (DK); Ciprian Biris, Hinnerup (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 348 days.

(21) Appl. No.: 17/634,959

(22) PCT Filed: Aug. 12, 2020

(86) PCT No.: PCT/DK2020/050232
§ 371 (c)(1),
(2) Date: Feb. 11, 2022

(87) PCT Pub. No.: WO2021/028003
PCT Pub. Date: Feb. 18, 2021

(65) Prior Publication Data
US 2022/0311354 A1 Sep. 29, 2022

(30) Foreign Application Priority Data

Aug. 13, 2019 (DK) .......................... PA 2019 70514
Sep. 12, 2019 (DK) .......................... PA 2019 70566

(51) Int. Cl.
*H02M 1/00* (2007.01)
*H02J 3/38* (2006.01)
(Continued)

(52) U.S. Cl.
CPC ........... *H02M 1/0095* (2021.05); *H02J 3/381* (2013.01); *H02M 1/322* (2021.05); *H02M 7/483* (2013.01);
(Continued)

(58) Field of Classification Search
CPC .. H02M 1/0095; H02M 1/322; H02M 7/4835; H02M 7/483; H02M 7/5395; H02J 3/381; H02J 2300/28
See application file for complete search history.

(56) References Cited

U.S. PATENT DOCUMENTS 9,954,358 B2 * 4/2018 Okaeme ............... H02M 7/4835
2011/0163702 A1 * 7/2011 Dommaschk ............ H02P 3/22
318/376
(Continued)

FOREIGN PATENT DOCUMENTS

CN 102355154 A 2/2012
CN 204013181 U 12/2014
(Continued)

OTHER PUBLICATIONS

Danish Patent and Trademark Office, 1st Technical Examination Report including the Search Report and Search Opinion for Application PA 2019 70514 dated Feb. 26, 2020.
(Continued)

*Primary Examiner* — Rafael O De Leon Domenech
(74) *Attorney, Agent, or Firm* — Patterson + Sheridan, LLP

(57) ABSTRACT

This disclosure proposes procedures and systems for discharging system capacitors and de-energizing power transmission systems having Modular Multilevel Converter (MMC) topologies by intelligent control of MMC cell components including configuration of bypass and insert switches using integrated DC choppers to effectively de-energize MMC cell capacitors and/or DC-link capacitors under operating conditions such as after a normal stop, for protection against over-voltages, dumping turbine energy, and under certain hardware fault conditions.

20 Claims, 24 Drawing Sheets

(51) Int. Cl.
*H02M 1/32* (2007.01)
*H02M 7/483* (2007.01)
*H02M 7/5395* (2006.01)

(52) U.S. Cl.
CPC ....... *H02M 7/4835* (2021.05); *H02M 7/5395* (2013.01); *H02J 2300/28* (2020.01)

(56) References Cited

U.S. PATENT DOCUMENTS

| | | | |
|---|---|---|---|
| 2014/0203632 A1 | 7/2014 | Kouno et al. | |
| 2018/0083550 A1 | 3/2018 | Chung et al. | |
| 2018/0323698 A1 | 11/2018 | Oh et al. | |
| 2019/0044427 A1* | 2/2019 | Fujii | H02M 7/483 |
| 2019/0199237 A1 | 6/2019 | Dorn et al. | |
| 2020/0266629 A1* | 8/2020 | Spooner | G01R 31/08 |
| 2020/0287378 A1* | 9/2020 | Spooner | H02H 3/025 |
| 2021/0058007 A1* | 2/2021 | Hario | H02M 7/4835 |
| 2021/0167705 A1* | 6/2021 | Augsburger | H02P 9/007 |
| 2021/0328523 A1* | 10/2021 | Chen | H02M 7/4835 |
| 2022/0045624 A1* | 2/2022 | Takahashi | H02M 1/32 |

FOREIGN PATENT DOCUMENTS

| | | |
|---|---|---|
| CN | 109830978 A | 5/2019 |
| EP | 2748906 A1 | 7/2014 |
| EP | 2913925 A1 | 9/2015 |
| EP | 3439158 A1 | 2/2019 |
| EP | 3544141 A1 | 9/2019 |
| WO | 2012140008 A2 | 10/2012 |
| WO | 2017102033 A1 | 6/2017 |
| WO | 2018091051 A1 | 5/2018 |
| WO | 2018154783 A1 | 8/2018 |
| WO | 2019120402 A1 | 6/2019 |
| WO | 2021028003 A1 | 2/2021 |

OTHER PUBLICATIONS

PCT, Invitation to Pay Additional Fees and, Where Applicable, Protest Fee for Application PCT/DK2020/050232 dated Nov. 13, 2020.
PCT, International Search Report for Application PCT/DK2020/050232 dated Jan. 18, 2021.
PCT, Written Opinion of the International Searching Authority for Application PCT/DK2020/050232 dated Jan. 18, 2021.

* cited by examiner

INTELLIGENT DISCHARGE CONTROL FOR MODULAR MULTILEVEL CONVERTER

FIELD OF THE INVENTION

Embodiments presented in this disclosure generally relate to wind turbine power generators and transmission systems including control of those generators and systems and wind turbine generator power conversion.

BACKGROUND

Different power converter topologies exist in medium voltage (MV) and high voltage (HV) converter transmission systems. In wind power applications, a typical power transmission system configuration uses two converter stations that are linked by direct current (DC) transmission lines commonly referred to as a DC-link. Each converter station employs an alternating current—direct current (AC/DC) converter to connect the DC-link to an alternating current (AC) network or power grid. Use of 2-level or 3-level voltage sourced converters (VSC) for the converter stations are typical in these configurations. In these deployments, it is often advantageous to connect a rail-to-rail DC chopper on the DC-link. However, it may be disadvantageous to connect a DC chopper on a DC-link for power converters using Modular Multilevel Converter (MMC) type topology.

As an example, in one power converter topology, to produce the requested power it may be beneficial to connect to AC networks operating at different frequencies. In such power transmission networks, converters may be used at each interface between AC and DC power to perform the conversion. For example, AC power from a wind turbine can be converted by a machine side converter to DC power which is transmitted via a DC-link to a line (or grid) side converter which converts the power back to an AC voltage and frequency compatible with the line (or grid) voltage. These systems may use a chopper circuit on the DC-link, sometimes referred to as a "braking chopper," to dissipate excess power supplied from the generator into a braking resistor, for example, during grid fault conditions which may lead to excess voltage at a DC-link capacitor. The power dissipated by the braking resistor is determined by a chopper switch. Because a potentially large amount of power may need to be dissipated and since the DC-link may typically have a voltage of several kilo-volts, the braking resistor may be quite large. Additionally, the higher voltages may require the use of a specific type of insulated-gate bipolar transistor (IGBT) such as press-pack which can increase the cost of the system.

In wind turbine generators, MMC topologies have begun to emerge having the advantage of a modular and more efficient design; however existing MMCs have issues associated with circulating currents, large capacitor voltage ripples, and balancing of cell capacitor voltages. Additionally, power from the generators may need to be quickly dumped to prevent harm to the converter and circuit components (e.g., sensitive semiconductor devices) such as in the case of a grid connection loss or to prevent damage to the turbine system (e.g., due to excessive rotor speeds). These MMCs are thus subjected to over-voltage stresses and high power losses in the form of heat dissipation and, in turn, hold a significant impact on the device power requirements and dimensions.

Current heat removal systems that include natural convection, forced convection, and liquid cooling are used, but can be costly in terms of money, time, and space resources. The required power ratings of the semiconductors, capacitors, and resistors used in medium/high DC voltage (MVDC/HVDC) converters also increases the cost. Also, although MMCs are more efficient than conventional converters, the switching losses associated with existing MMC power devices results in increasing the energy dissipation needs of the system especially as the number of switching state levels increases exponentially with the increase in the number of converter voltage levels.

Further, during service and maintenance of the MMCs, it is important that the energy storing elements are safely de-energized before human interaction. In the case of an MV converter based on MMC topology, for example, numerous capacitors, both in converter cells and in any connected DC-link should be de-energized. This has been done passively by using bleed resistors connected across all capacitors. The passive discharge is simple but requires additional resistive components and is associated with a constant power loss. Additionally, hardware faults in MMC systems may present problems in safely de-energizing the converter system. Thus a safe, space conscious and efficient means of removing energy and heat from the system is needed.

SUMMARY

One embodiment described herein is a method of controlling a modular multilevel converter (MMC) as part of a wind turbine system, where the system comprises a plurality of MMC cells connected in series, where each of the MMC cells comprises at least two main switches and an integrated direct current (DC) chopper. The method includes: detecting a system discharge event and controlling the integrated DC choppers to de-energize one or more cell capacitors in each of the plurality of MMC cells in response to the system discharge event.

Another embodiment described herein is a method of de-energizing a wind turbine MMC system, where the MMC system comprises a plurality of series-connected MMC cells and a DC-link having a first voltage rail and a second voltage rail. The method incudes enabling a first discharge path from the first voltage rail through the plurality of series-connected MMC cells to the second voltage rail; and grounding the second voltage rail with an earthing resistor where the first discharge path includes the earthing resistor.

Another embodiment described herein is a method of de-energizing a wind turbine MMC system where the system comprises a plurality of series-connected MMC cells and a DC-link having a first voltage rail and a second voltage rail. The method includes: enabling a first discharge loop including a current path from the first voltage rail and through the plurality of series-connected MMC cells to the second voltage rail; and enabling a second discharge loop having a current path from the first voltage rail, through a second plurality of series-connected MMC cells, to the second voltage rail where the first discharge loop includes MMC cells from a different phase.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore are not to be considered limiting of its scope, for the disclosure may admit to other equally effective embodiments.

FIGS. 9A-9C illustrate cell discharge path configurations as used in a discharge loop for a healthy MMC cell, a faulty MMC cell with one faulty integrated DC chopper, and a faulty MMC cell with two faulty integrated DC choppers respectively.

FIGS. 10B-10D illustrate cell discharge path configurations as used in a discharge loop for a healthy MMC cell, a faulty MMC cell with one faulty integrated DC chopper, and a faulty MMC cell with two faulty integrated DC choppers respectively.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Figure 1:
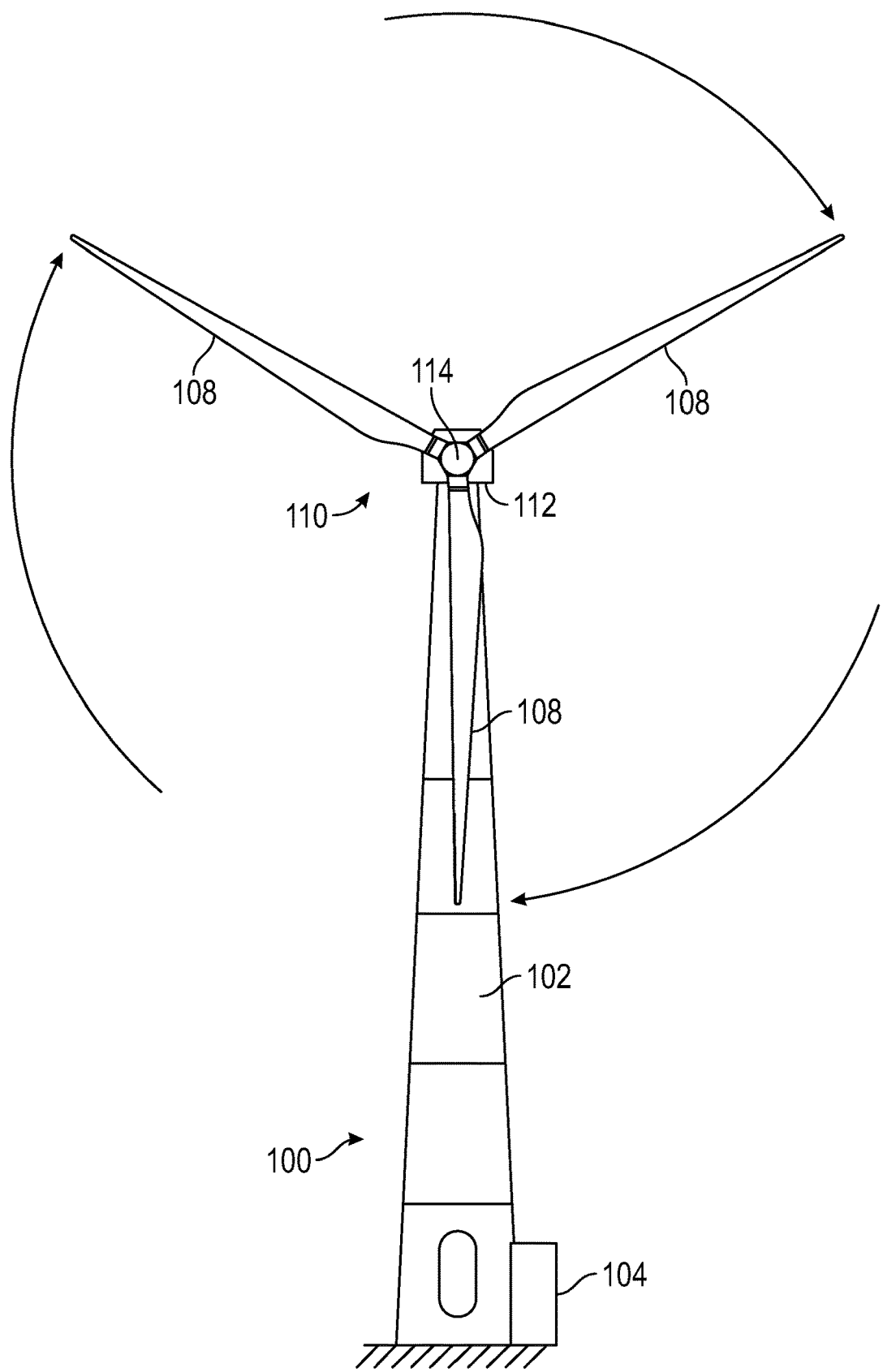
FIG. 1 illustrates a diagrammatic view of a wind turbine, according to one or more embodiments described in this present disclosure.

Embodiments herein describe procedures and systems for discharging system capacitors and de-energizing power transmission systems having Modular Multilevel Converter (MMC) topologies. Intelligent control of MMC cell components including cell transistors (e.g., IGBTs), integrated chopper dump-load resistors, and other system components provide a safe discharge of cell capacitors and DC-link capacitors in different operating conditions. Particular embodiments are related to situations where part of the converter is out of operation and where the faulted part cannot be relied on in the discharge process. An advantage of some embodiments is that the same hardware can be used to provide discharge operation in various operating conditions. The discharge operations as described herein are discussed with respect to four categories: I) after a normal stop, II) for protection against over-voltages, III) dumping energy coming from the machine side converter (e.g., wind turbine generator), and IV) under hardware fault conditions. For the hardware fault conditions (category IV) the procedures follow a sequence to discharge the system's capacitors as much as possible independent of the hardware failure.

MMC converters generally comprise a plurality of MMC cells (also referred to as sub-modules or stacks) connected in series as part of a phase leg coupled to a DC-link. Each MMC cell may include (or may be included in) one or more separate power modules which includes some or all of circuitry of the MMC cell (e.g., IGBTs, cell capacitors, diodes, resistors, and the like) that are modular in nature and may each have the same, or substantially the same, physical footprint or input/output interface. The modules may therefore be substituted or swapped out relatively easily. Rather than discharging the system through a DC chopper connected to the voltage rails of the DC-link (which may require using special IGBTs such as press-pack), embodiments herein discharge the system, at least in part, by operating circuitry within the MMC cells including DC choppers that may be integrated into each of the MMC cells. That is, in one example, each cell (or each power module) includes its own DC chopper. The integrated DC chopper may be connected between two voltage rails (e.g., a positive voltage rail and a negative voltage rail) in each cell and in parallel with two or more series-coupled main switches. In one embodiment, the integrated DC chopper includes at least one controllable switch (e.g., a chopper switch or transistor) coupled in series to a diode, and a dump-load resistor coupled in parallel to the diode. Embodiments herein describe de-energization control strategies for MMC integrating DC choppers into the MMC cells during the different categories of operation.

As detailed further below, embodiments herein leverage the modularity of the MMC topology protecting against over-voltages at either converter level, arm level, or individual cell level. The integrated DC choppers further provide paths for efficient dumping of generator energy as well as discharging DC-link capacitors and MMC cell capacitors that would not be available using a rail-to-rail chopper on the DC-link. Furthermore, this solution also works well with cell voltage balancing algorithms often used with MMC type converters, and may eliminate the need for large chopper dump-load resistors and cell bleed resistors. The proposed solution also provides for improved scaling in power and chopping ability as the number of voltage levels varies with the converter.

EXAMPLE EMBODIMENTS

FIG. 1 illustrates a diagrammatic view of a horizontal-axis wind turbine 100 for generating electrical power. The wind turbine 100 typically comprises a tower 102 and a nacelle 112 located at the top of the tower 102 in an up-tower assembly 110. A wind turbine rotor 114 may be connected with the nacelle 112 through a low speed shaft extending out of the nacelle 112 to drive a generator. The wind turbine rotor 114 comprises three rotor blades 108 (or airfoils) mounted on a common hub which rotate in a rotor plane, but may comprise any suitable number such as one or more blades. The rotor blades 108 typically each have an aerodynamic shape with a leading edge for facing into the wind, a trailing edge at the opposite end of a chord for the rotor blades 108 attached in a suitable manner.

For some embodiments, power conversion and power generation circuits may be located in the up-tower assembly 110 or in a down-tower location such as a down-tower cabinet 104 or inside a base of the tower 102 for ready access and protection from weather events. These circuits and other electronics may also be located off site, in a central location to a number of wind turbines 100, or spread out in a combination of these places. One advantage of having the electronics, especially power conversion circuits in a down-tower location (e.g. cabinet 104) is that maintenance personnel may have easy access to the circuits for maintenance, repair, and inspection. Although shown outside the tower 102, this is not a requirement. For example, in some embodiments, cabinet 104 is located inside the tower 102 or at another location.

Figure 2A:
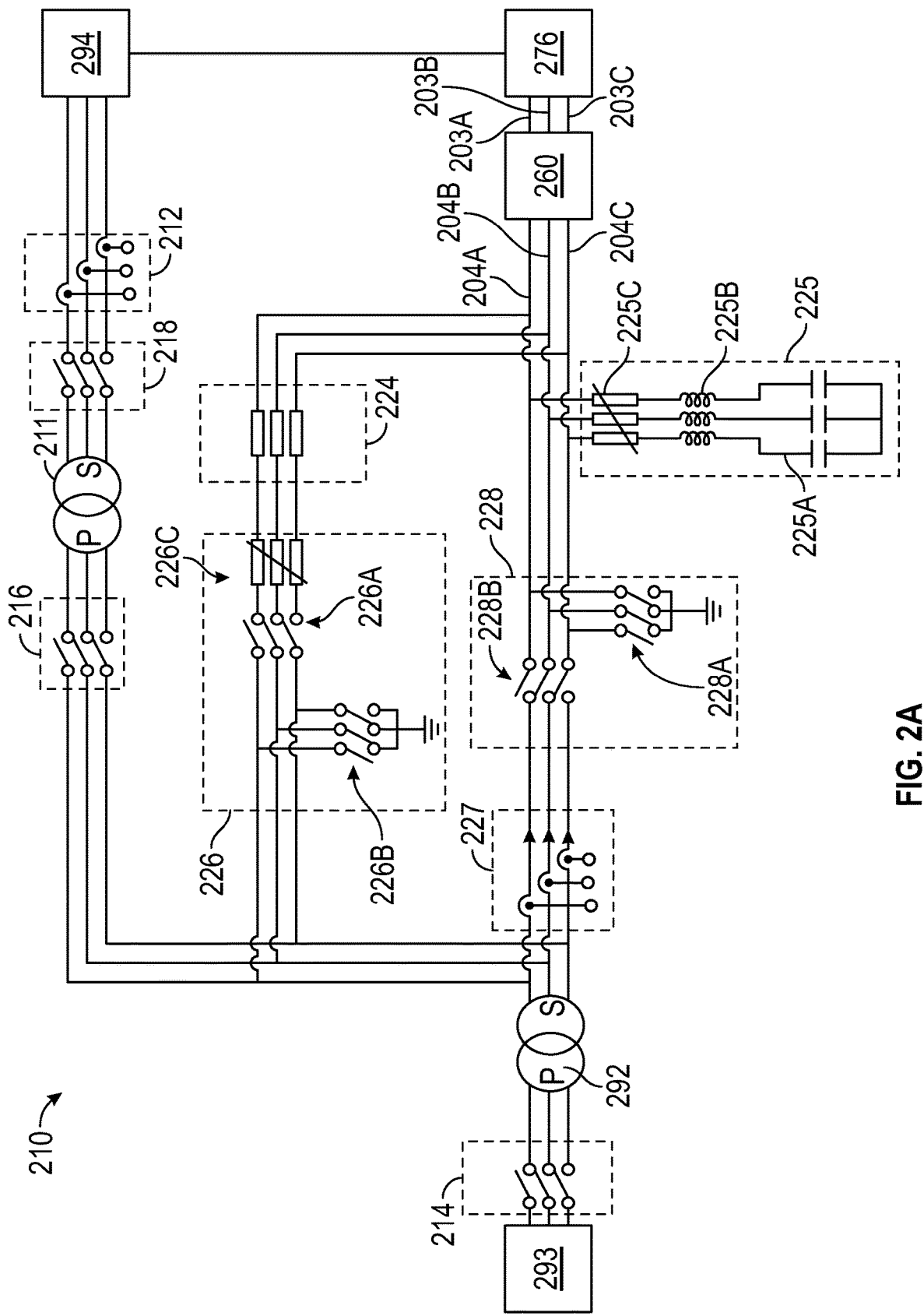
FIG. 2A illustrates a simplified schematic example of a power transmission system according to one or more embodiments described in this present disclosure.

FIG. 2A illustrates a simplified schematic example of a power conversion and transmission system 210. The configuration of the power conversion and transmission system 210 may vary. For example the power conversion and transmission system 210 may utilize different types of power generators (e.g., Doubly Fed Induction Generators, Permanent Magnet Generators, and hybrid generators) and therefore have different configurations and topologies. The configuration shown is by way of an example and should not be considered as limiting use of the disclosed embodiments.

In this example, the converter system 260 receives an alternating current (AC) from a generator 276 (e.g., as may be used in a wind turbine 100) and is rectified to a direct current (DC) and inverted to another AC that is suitable to be supplied to a power grid 293 which may need to receive power, for example, at a frequency different than generator 276 provides. A power grid transformer 292 may be used to prepare a voltage output of the converter system 260 to an appropriate grid voltage. Auxiliary equipment 294 is used to monitor and control the wind turbine 100 and the generator 276. For example, auxiliary equipment 294 may include main controls, screens, communications, pumps, fans, yaw motors, and the like. In this example, the generator 276 supplies, and the grid 293 receives, three-phase AC power, however this is not a particular requirement as different topologies of the transmission system 210 may supply or receive any number of AC phases.

One or more of the following steps associated with the components in the example configuration of the power conversion and transmission system 210 shown may be used in a procedure to de-energize at least a portion of the transmission system 210 and, in operational category IV, ensure that independent of the type of hardware failure the converter may have been exposed to, the system is discharged to the highest degree possible.

- The MV draw-out circuit breaker 228B is opened by remote control (e.g., by main controller 273, a separate remote controller, or a motorized truck system (not shown)).
- Feedback from the MV draw-out circuit breaker 228B confirms to the control compartment that the circuit breaker is physically separated from both incoming terminals and outgoing terminals (i.e., in test position).
- The MV draw-out contactor 226B is opened remotely (e.g., by main controller 273, a separate remote controller, or a motorized truck system (not shown)).
- Feedback from MV draw-out contactor 226B confirms to the control compartment that contactor is physically separated from both incoming terminals and outgoing terminal (i.e., test position).
- Automatic discharge of AC-filter capacitors 225A is built in into the capacitors and to allow safe discharge before next step, a timer (not shown) prevents moving to next step until discharge of capacitors are completed.
- When both feedbacks from contactor 226B and circuit breaker 228B are received by control system and the time-out for discharge is completed, the control system allows earthing switch 228A to be engaged—thereby grounding the circuitry of converter system 260 and filter capacitor 225A.

Figure 2B:
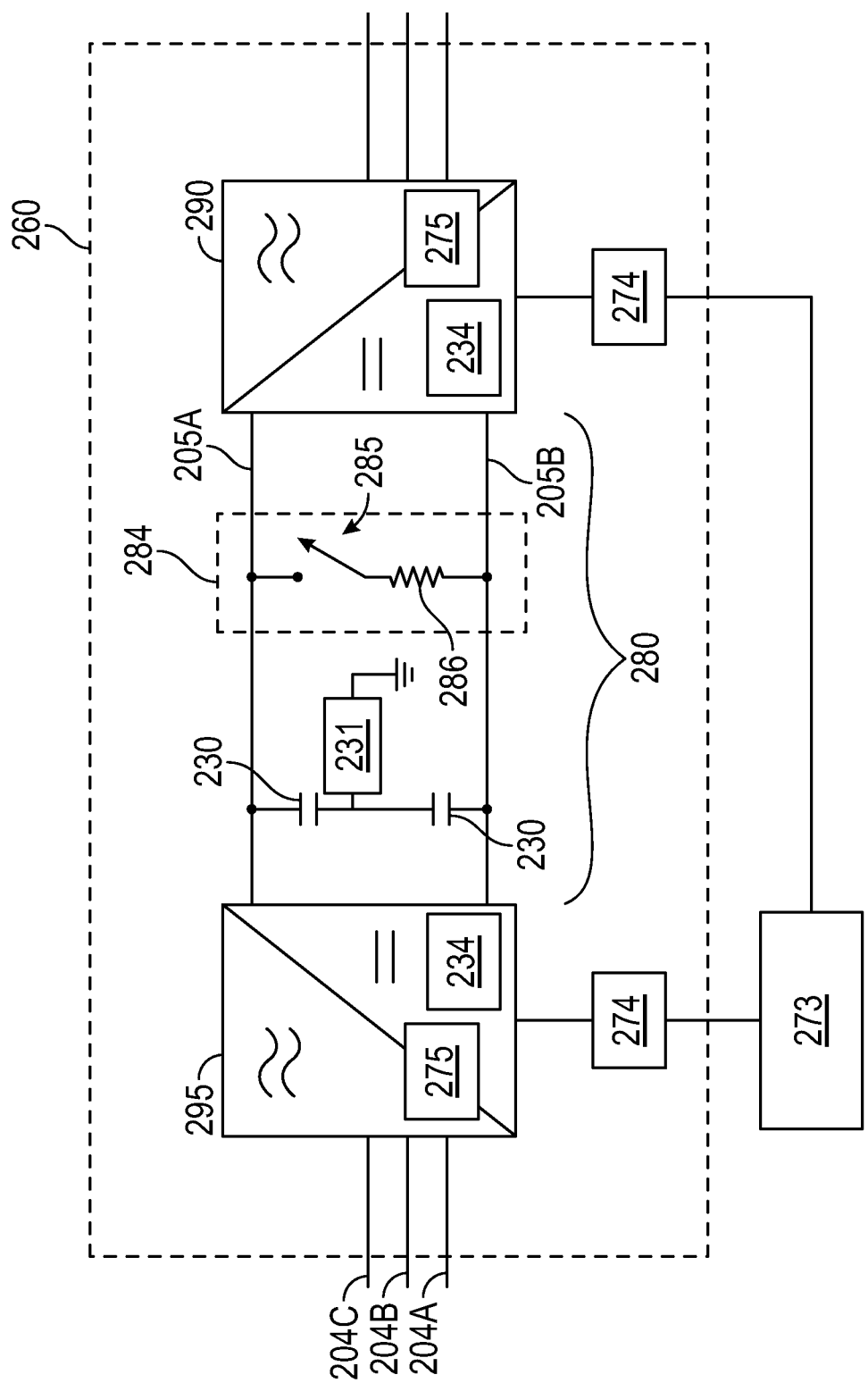
FIG. 2B illustrates a simplified schematic example of a converter system configuration according to one or more embodiments described in this present disclosure.

FIG. 2B shows the converter system 260 which operates by converting the AC power supplied by the generator 276 to DC via side converters 290, 295 used for power conversion. For example, a machine side converter (MSC) 295 acts as a rectifier converting the AC to DC which may then be converted back to AC via a line side converter (LSC) 290 inverter. The MSC 295 and the LSC 290 are coupled by means of a DC-link 280. Control of the side converters 295, 290 is provided by one or more controller circuits (e.g., main controller 273, phase/arm controller 274, cell controller 275) that may be, for example, simple circuits operated by switches, or may be more complex circuits, for example, a programmable logic controller. In general, the main controller 273 is superordinate to the phase/arm controllers 274, which may generally be superordinate to the cell controllers 275. The cell controllers 275 may, in some configurations, be powered by the circuits they control (e.g., MMC cells) that they control or powered by one or more side converters 295, 290. Further, the converters 295 and 290 can be implemented using an MMC 200 which is described in more detail in FIG. 2C.

As another example, the main controller 273 may take on a superior role to subservient controllers (e.g., to phase/arm controllers 274 and subsequently to cell controllers 275) that distribute control over the system. Thus, each of the cell controllers 275 may be integrated into the converter system 260 and each side converter 295, 290 may have its own phase/arm controller 274. In some embodiments, de-energization of the power converter is carried out and/or is determined by one or more controllers (e.g., main controller 273, phase arm controller 274, cell controller 275). Depending on topology, for example, de-energization may be generally accomplished by the main controller 273 determining via controller hardware and/or software what type of de-energization is to take place, and transferring a discharge command to cell controllers 275 (e.g., controller cards) via phase/arm controllers 274. Although shown separately, the controller circuits may be organized differently (e.g., in a distributed control system or a centralized control system). As such, actions described herein attributed to any of these controllers: main controller 273, phase/arm controller 274, and cell controller 275, should be understood as being an example configuration and may generally be referred to as the "controller" 272 illustrated in FIG. 2D.

As shown in FIG. 2B, the DC Link 280 has two DC-link capacitors 230 to store and maintain the DC voltage between the MSC 295 and the LSC 290. The two DC-link capacitors 230 may be connected to a neutral (common) voltage node connected to earth ground through an earthing resistor 231 and the non-common DC-link capacitor terminals connected to DC-link voltage rails 205A, 205B (e.g., positive and negative rails). Although shown in FIG. 2B as having two DC-link capacitors 230, the DC-link 280 is not so limited and, in some embodiments, may not have any DC-link capacitors 230 or may include a number of DC-link capacitors 230. In some embodiments, the DC-link 280 may include one or more DC-link capacitors 230 connected directly across the DC-link voltage rails 205A, 205B, i.e., may not use a neutral voltage node, and may not have an earthing resistor.

In some configurations, the DC-link 280 may include a DC-link chopper 284 acting as a braking circuit. The DC-link chopper 284 may be a resistor/switch combination connected in parallel with two DC-link capacitors 230. In particular, the DC-link chopper 284 may include a braking resistor 286 and a switch 285 that may be configured to be manually controlled and/or controlled via controller 272. In this arrangement, if excess power is supplied from the generator 276 shown in FIG. 2A, it can be dissipated by the braking resistor 286, for example, during grid fault conditions. In some embodiments, a relay or other suitable circuit (e.g., phase/arm controller 274) senses the voltage at the DC-link capacitor 230 and sends a signal to control the switch 285 whenever the voltage at the DC-link 280 rises above a threshold value, thus preventing the DC-link voltage from rising excessively and potentially damaging the wind turbine or any of its electronic circuitry. The power dissipated by the braking resistor 286 may be controlled by a duty cycle of the switch 285.

However, rather than relying on the DC-link chopper 284, FIG. 2B shows side converters 295, 290 that include integrated DC choppers 234. The components and functions of the integrated DC choppers 234 are discussed in more detail below. In some embodiments, at least one of the side converters 295, 290 are MMCs and the integrated DC choppers 234 are integrated into each of the MMC cells. While FIG. 2B illustrates a converter system with both integrated DC choppers 234 and a DC-link chopper 284 connected to the DC-link 280, the DC-link chopper 284 is not required, and the converter system may include only the integrated DC choppers 234 (i.e., the DC-link chopper 284 may be omitted).

Figure 2C:
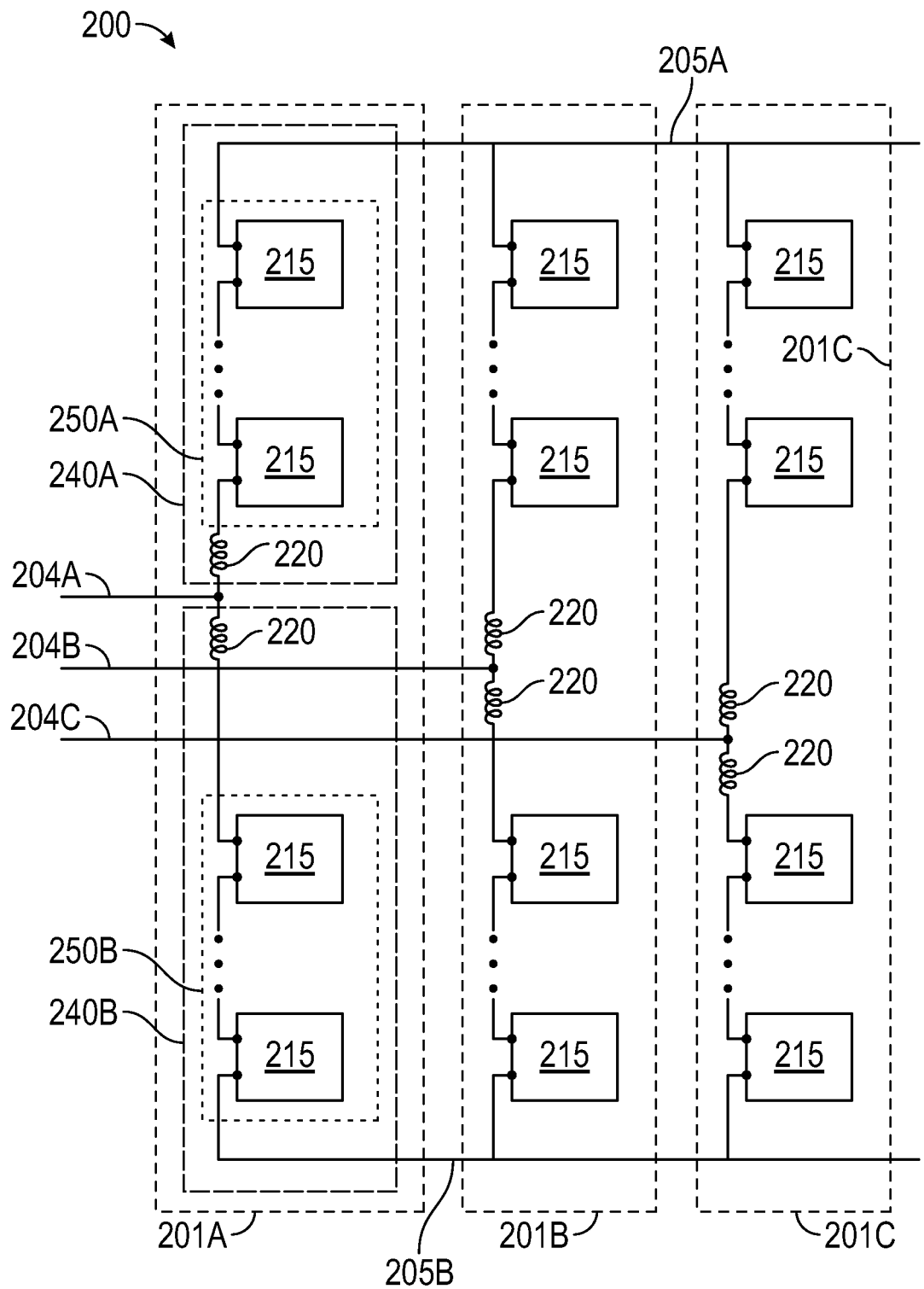
FIG. 2C illustrates a three-phase MMC system according to one or more embodiments described in this present disclosure.

FIG. 2C shows the basic schematic structure of the MMC 200 that converts three-phases. According to some embodiments, the LSC 290 inverter is an MMC 200 and the MSC 295 rectifier is also an MMC 200. However, MMCs 200 used as LSC 290 and MSC 295 do not necessarily have to be the same. The MMC 200 has three phase legs 201A, 201B, 201C each phase leg 201 having a corresponding phase leg AC input/output 204 (e.g., AC inputs/outputs 204A, 204B, 204C). Each phase leg 201 may have two phase arms 240A, 240B, i.e., an upper phase arm and a lower phase arm (indicated by dashed boxes). For simplicity of illustration, only the phase arms for one phase leg 201A are so indicated. As shown, phase leg 201A has an upper phase arm 240A that includes two MMC cells 215 and an arm inductor 220 connected in series. The phase arm, however, may include any number of series connected MMC cells 215. In some embodiments, lower phase arm 240B is a mirror of upper phase arm 240A about the phase leg AC input/output. Although the MMC 200 is shown having three-phase legs, the converters are not so limited and that any appropriate number of phase legs may be used in accordance with embodiments of the invention.

At an end of each arm is a voltage rail that may be connected to the DC-link 280 shown in FIG. 2B. As shown, the upper phase arm 240A is connected to the upper DC-link voltage rail 205A. Similarly, the lower phase arm 240B is connected to lower DC-link voltage rail 205B. The DC-link voltage rails 205 form the DC-link voltage rails that serve as the DC input/output of the MSC 295 and the LSC 290 shown in FIG. 2B. Further, in some embodiments, the number of DC-link capacitors 230 (FIG. 2B) is equal to or proportional to the number of MMC cells 215 comprised in the MMCs 200 that are connected to the DC-link 280.

MMC cell circuitry 250A, 250B may comprise electrical components, wiring, and connections within the MMC cells 215. As discussed below with respect to FIG. 2D, the MMC cell circuitry 250 may be organized into modules. Although each MMC cell 215 uses one or more signals from the controller 272 to control the MMC cell circuitry 250 (e.g., controlling gates of semiconductors in the MMC cells 215) in operation of the MMC, for simplicity of illustration these control signals are not shown. Although each arm/leg of the MMC 200 comprises MMC cell circuitry 250, for simplicity of illustration, only MMC cell circuitry 250A, 250B from phase leg 201A is so indicated.

Figure 2D:
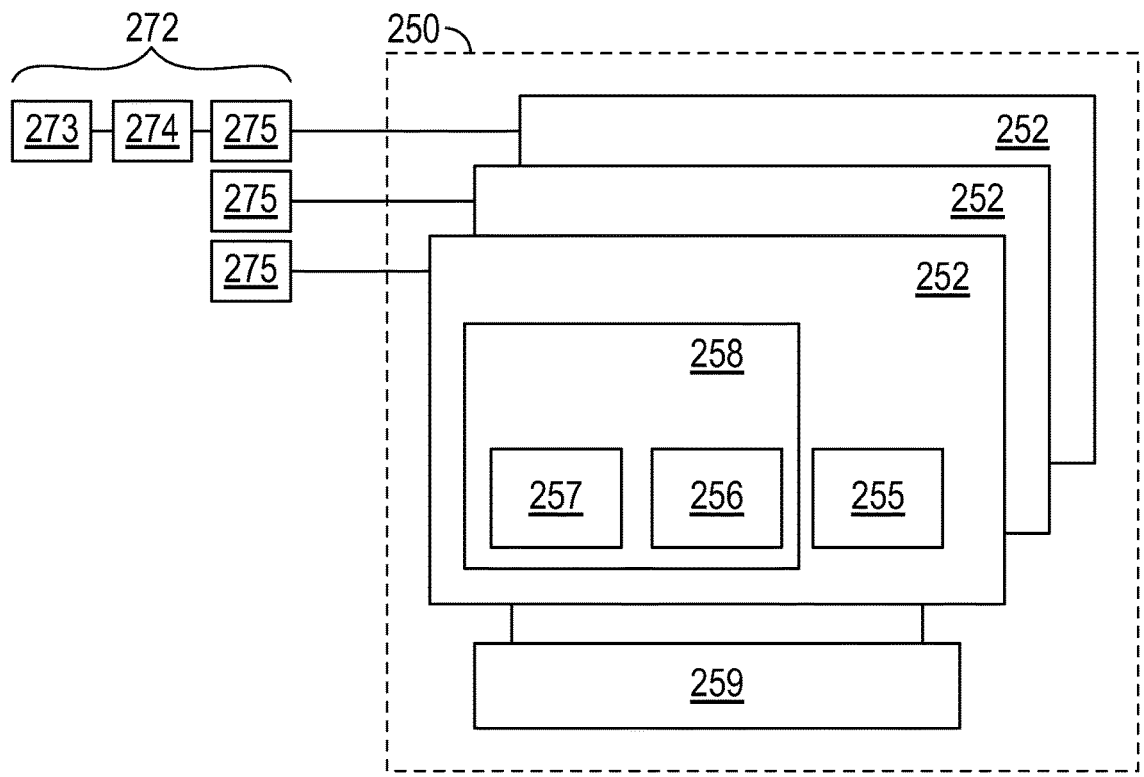
FIG. 2D illustrates an organizational block diagram of MMC cell circuitry as organized into power modules having integrated DC choppers according to one or more embodiments described in this present disclosure.

FIG. 2D shows a block diagram of MMC cell circuitry 250 illustrating an example physical arrangement of MMC elements according to embodiments disclosed herein. In an embodiment, the MMC cell circuitry 250 comprises one or more power modules 252. Conversely, in other embodiments, a power module 252 may comprise the MMC cell circuitry 250 for one or more MMC cells 215 illustrated in FIG. 2C. Each power module 252 may comprise power transistors 255 of the MMC cells and one or more DC chopper circuits 258 (e.g., circuitry of the integrated DC chopper 234 illustrated in FIG. 2B). Power module 252 may also comprise other electrical components (e.g., diodes) and electrical connections including control signal connections and input and output connections that correspond to cell inputs and cell outputs of the MMC cell. The electrical connections may serve to electrically connect the power module 252 to other converter circuitry. For example, the electrical connections may electrically connect one power module 252 to a second power module 252. This type of connection may also serve to connect MMC cells within the MMC cell circuitry 250, for example, where the circuitry within one MMC cell corresponds to one power module 252. The connections may be made directly or indirectly (e.g., via a connection bus or bar thus providing a fast and simple means to connect and disconnect the power modules 252).

Each power module 252 may be physically identical and therefore may be swapped or substituted for one another. As used in a modular system such as the MMC 200 illustrated in FIG. 2C, power modules 252 are modular system components that may be relatively easily replaced when faulty or requiring inspection or service. The power module 252 may have a heat interface (not shown) for thermally coupling a chopper resistor 257 with a heat removing system (e.g., a fluid cooling, heat sink, fans, etc.). In some embodiments, each power module 252 is connected to an external circuitry block 259 which may alternatively include the chopper resistor 257 and other MMC cell circuitry such as cell capacitors, and the like, as is described in further detail below. In some embodiments, rather than disposing a heat sink in the power module 252, heat sinks for the power modules 252 may be disposed external to the power module 252 but are nonetheless thermally coupled to the circuitry in the power module 252. In some embodiments, the power module 252 may comprise cell capacitor connections that electrically connect the power module 252 to one or more cell capacitors in the external circuitry block 259.

The integrated DC chopper circuit 258 may comprise a controllable switch 256 and a chopper resistor 257. In some embodiments, the chopper resistor 257 is integrated into a heat sink to distribute heat energy from the power module 252. That is, chopper resistor 257 can represent a heat sink and a chopper resistor. The chopper resistor 257 may be integrated into each MMC cell 215 or may be integrated into each power module 252 of the MMC 200, thus distributing the dissipated energy throughout the MMC 200.

A cell controller 275 may be used to control the circuitry (e.g., power transistors 255 and the controllable switches 256) of the power module 252. The cell controller 275 may be used with one or more other controllers 273, 274, 275 in FIG. 2B to operate the MMC. For example, the main controller 273 may calculate a reference voltage for each phase arm at a period of several microseconds, and communicate that to the phase/arm controller 274 which may decide the switching status of the power transistors 255 on every power module 252 according to capacitor voltages measured by cell controller 275 and communicated up the chain to the phase/arm controller 274 which may measure phase arm current directions. Additionally, these controllers (i.e. controller 272) may provide the PWM control to each of the power transistors 255 in normal converter operation.

Figure 3A:
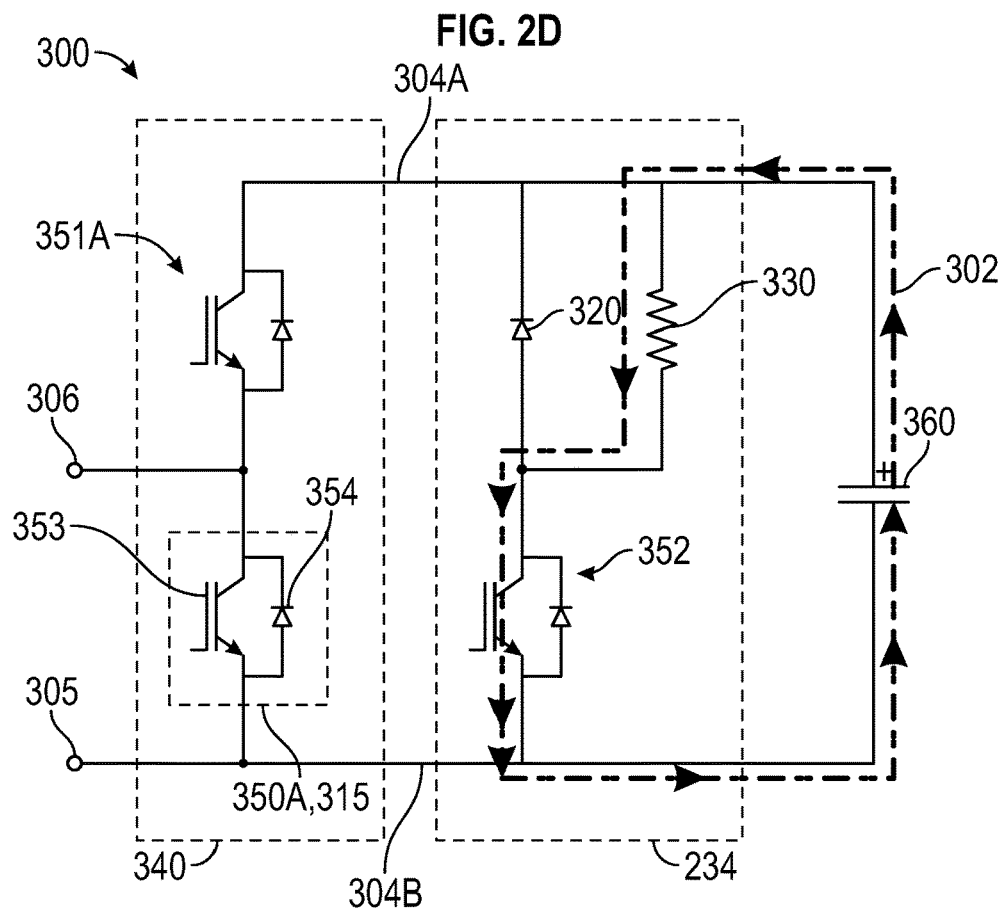
FIG. 3A illustrates a discharge loop shown in the schematic of an MMC single cell with integrated DC chopper and dump-load resistor according to one or more embodiments described in this present disclosure.

FIG. 3A shows an electrical schematic for an MMC single cell 300 which is an example of the MMC cell 215 illustrated in FIG. 2C according to one or more embodiments described. The MMC single cell 300 includes a cell input 305 and a cell output 306. MMC single cell 300 includes three semiconductor switches. In the embodiment shown, the semiconductor switches are Insulated Gate Bipolar Transistors 353 (IGBTs) however other switch devices such as Integrated Gate-Commutated Thyristors (IGCTs), Power MOSFETs (Metal-Oxide-Semiconductor Field Effect Transistors) (e.g., Silicon Carbide MOSFETs), and the like may also be used. The IGBT 353 is coupled to an anti-parallel diode 354 which may be integrated with the IGBT. The combination of anti-parallel Diode and IGBT ("DIGBT") is referred to herein as a DIGBT 315. That is, a diode connected anti-parallel to the IGBT 353 such that its anode is connected to the emitter of IGBT 353 and its cathode is connected to the collector of IGBT. In particular, DIGBT 315 comprises a switching transistor (e.g., IGBT 353 controlled by its gate. The anti-parallel diode 354 may allow current to flow in one direction (a "reverse" direction) across the DIGBT 315 when its IGBT 353 is not conducting. The anti-parallel diode 354 of DIGBT 315 may also be formed in different ways, (e.g., by connecting two transistors in anti-parallel with each other). Current running through the DIGBT 315 in the direction opposite of "reverse" current as used herein has current in a "conducting" direction. The IGBTs 353 and DIGBTs 315 are examples of the switching transistors 255 used in the power modules 252 (FIG. 2D).

Specific instances or usage types of DIGBTs 315 may be referred to herein simply as "switches" or by a functional type (e.g., bypass switch 350A). The main switches 340 are DIGBTs 315 and comprise both bypass switches 350 and insert switches 351 which are the main power switches of the MMC cell. While DIGBTs 315 are shown, in an alternative embodiment reverse-conducting IGBTs (RC-IGBT) could be used instead. A RC-IGBT, in one embodiment, uses a single chip containing both an IGBT and diode instead of two separate chips where one includes the IGBT and the other includes the diode.

For the MMC single cell 300, the main switches 340 include bypass switch 350A and insert switch 351A. The main switches 340 are arranged in a half-bridge configuration with the cell input 305 of MMC single cell 300 connected to the emitter of bypass switch 350A and a lower cell voltage rail 304B. The collector of bypass switch 350A is connected to the cell output 306 and is also connected to the emitter of the insert switch 351A. The collector of the insert switch 351A is connected to an upper cell voltage rail 304A. References to the emitter, collector, and gate of switches described herein refer to the IGBT 353 in the switch. Again, for clarity, control signals connecting to the gates of the switches from the controller (e.g., the cell controllers 275 in FIG. 2D) are not shown.

The MMC single cell 300 includes an integrated DC chopper 234 between the cell voltage rails 304A, 304B. An MMC cell capacitor 360 that stores energy in the cell is also connected between the cell voltage rails 304A, 304B in parallel with the integrated DC chopper 234. In an embodiment, the integrated DC chopper 234 includes a DIGBT 315 referred to herein as a chopper switch 352. The chopper switch 352 is connected in series with the free-wheeling diode 320 between the lower cell voltage rail 304B and the upper cell voltage rail 304A. The integrated DC chopper 234 also may include a dump-load resistor 330 that is connected in parallel with the free-wheeling diode 320. The dump-load resistor 330 is an example of the chopper resistor 257 illustrated in FIG. 2D.

In one embodiment, the IGBT 353 of the chopper switch 352 serves as the controllable switch 256 illustrated in FIG. 2D (i.e., a controllable chopper switch) that is operated to control the voltage across the integrated DC chopper 234. Specifically, the voltage across the integrated DC chopper 234 (and thus the power dissipated by the cell dump-load resistor 330), may be controlled by varying the duty cycle of the chopper switch 352 thereby varying the current that flows through the dump-load resistor 330. In some embodiments, the duty cycle may be determined by a controller (e.g., the controller 272 in FIG. 2D) preferably using pulse width modulation ("PWM"). When the MMC cell capacitor 360 is charged or at least partially charged, a current discharge path, discharge loop 302 may be used for discharging the MMC cell capacitor 360. In particular, the discharge loop 302 includes a current discharge path through the dump-load resistor 330. The discharge path is enabled when chopper switch 352 is turned on thus allowing a conducting current to flow through the chopper switch 352.

The energy that is dumped into by the dump-load resistor 330 usually comes from the generator and which is unable to find its way to the grid due to a grid fault or disconnection. This energy is typically much higher than the energy stored in the cell capacitors. So, in one embodiment the size and mass of the dump-load resistors 330 is dictated by that dumped energy rating, and not by the stored energy rating of the MMC cell capacitor 360. If the application is different than a wind turbine and no energy dumping is needed, this may not be the case. The dump-load resistor 330 may be physically partitioned within the power module to provide proportional heat dissipation according to the expected dissipation of each power device. In some embodiments, the dump-load resistor 330 comprises a plurality of series and/or parallel connected resistors such that the switching transistors 255 in the power module 252 in FIG. 2D include a separate heat sink with the equivalent electrical connection as a single dump-load resistor 330. Embodiments of the present disclosure eliminate or reduce the need for a DC-link chopper at the DC-link. For example, referring to FIG. 2B, the DC-link chopper 284 may be omitted.

Figure 3B:
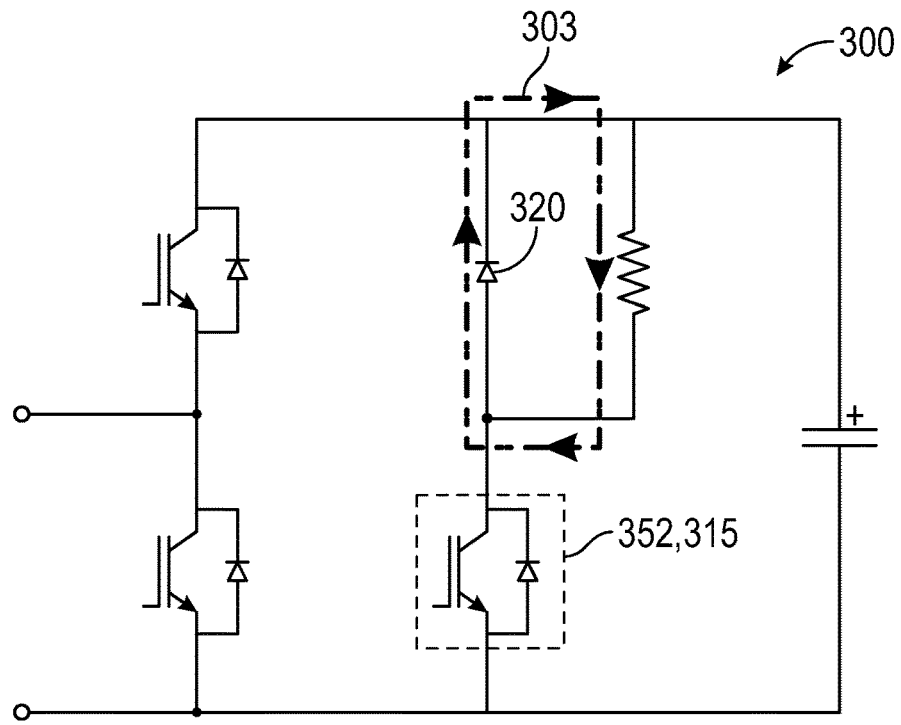
FIG. 3B illustrates a free-wheeling loop shown in the schematic of an MMC single cell with integrated DC chopper and dump-load resistor according to one or more embodiments described in this present disclosure.

FIG. 3B illustrates the free-wheeling current discharge loop 303 showing the current discharge path in MMC cell 300 when the chopper switch 352 in the discharge loop 302 illustrated in FIG. 3A is turned off. In free-wheeling loop 303, current continues to run for a short time through the dump-load resistor 330 in the same direction as in the discharge loop 302. However, instead of flowing through controllable chopper switch 352, the return path of the current runs through the free-wheeling diode 320. Again, as above, the duty cycle of the chopper switch 352 determines the power dissipated through the dump-load resistor 330. Thus, the MMC cell capacitor 360 may be discharged effectively without exceeding the tolerances of the components in the discharge path.

Figure 3C:
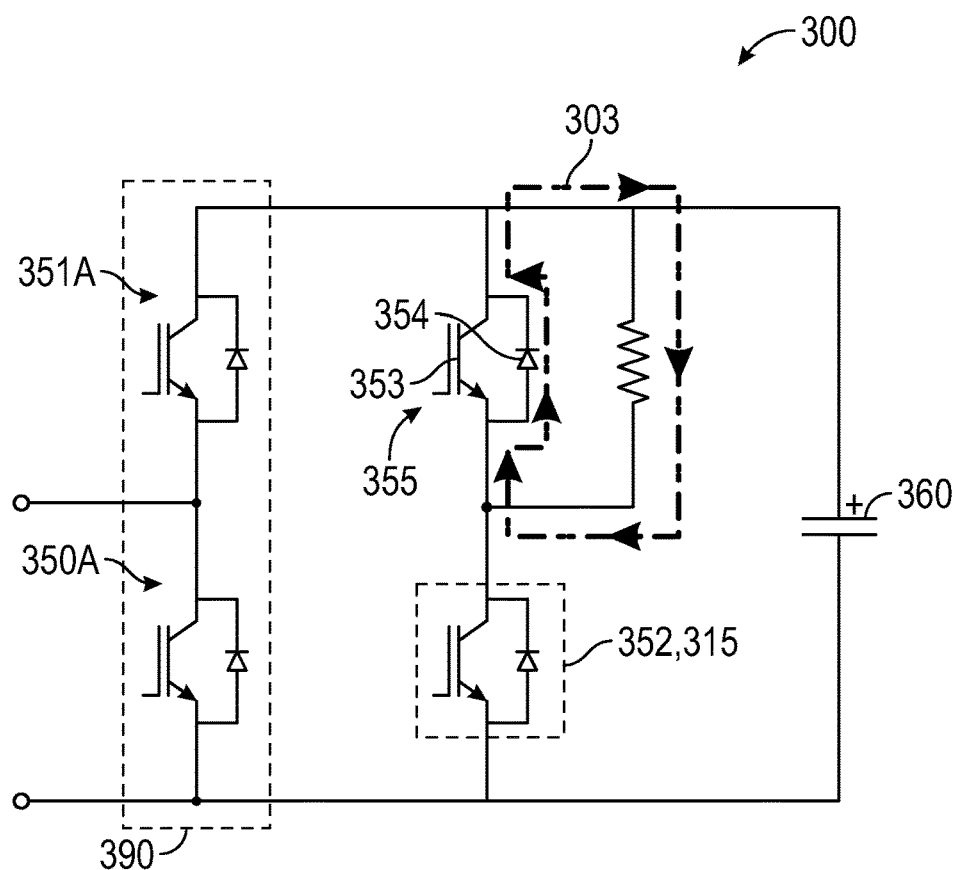
FIG. 3C shows a schematic of an MMC single cell with integrated DC chopper and dump-load resistor illustrating a free-wheeling loop using an IGBT integrated diode according to one or more embodiments described in this present disclosure.

FIG. 3C shows an electrical schematic for an MMC single cell 301 which is an example of MMC cell 215 illustrated in FIG. 2C according to one or more embodiments described. MMC single cell 301 in FIG. 3C is essentially the same as MMC single cell 300 in FIG. 3B except where the free-wheeling diode 320 is replaced with a free-wheeling DIGBT 355 that is a DIGBT (e.g., DIGBT 315 illustrated in FIG. 3A) where the anti-parallel diode 354 of free-wheeling DIGBT 355 serves the purposes of the free-wheeling diode 320 (e.g., providing the free-wheeling loop 303). In this configuration, the controller may configure the free-wheeling DIGBT 355 to be "off" (i.e., in a non-conducting state) to restrict current from flowing in a direction opposite of the anti-parallel diode 354. Alternatively, the gate of free-wheeling DIGBT 355 may be tied off such that the IGBT 353 of free-wheeling DIGBT 355 is always in a non-conducting state. The free-wheeling current in free-wheeling loop 303 thus runs through the anti-parallel diode 354 of the free-wheeling DIGBT 355.

By replacing the free-wheeling diode 320 with the free-wheeling DIGBT 355, this arrangement may further modularize the power module illustrated in FIG. 2D. For example, if identical or similar DIGBT 315s are used for the chopper switch 352 and the free-wheeling DIGBT 355, the module may be more symmetric, for example, with respect to the placement and/or signal routing of the switching transistors 255 within the power module 252 in FIG. 2D. Additionally, even though there may be advantages for using different devices, the bill of materials may possibly made simpler by only having one power type device (e.g., DIGBT 315) in the module for the main switches 340 (i.e., bypass switch 350A and insert switch 351A) and the chopper switch 352 and the free-wheeling DIGBT 355. This may also potentially simplify the repair of faulty power modules.

In another embodiment, referring back to FIG. 3A, an optional bleed resistor (not shown) may be included in the cell and placed in parallel with the MMC cell capacitor 360 (and also the integrated DC chopper 234). In some embodiments, for example, the addition of the bleed resistor across the MMC cell capacitor 360 may be desired to complement the operation of the integrated DC chopper 234. For example, in some cases, a low voltage operation of the integrated DC chopper 234 may not be feasible or desired; in this case, the bleed resistor may continue to discharge the MMC cell capacitor 360 when the integrated DC chopper 234 is not active.

Figure 4B:
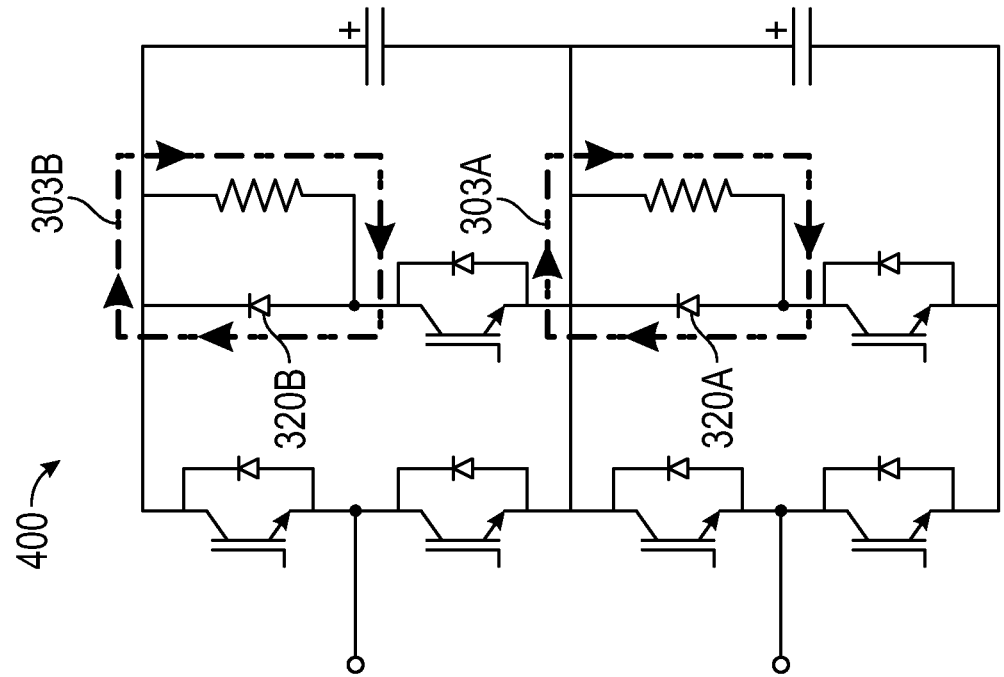
FIG. 4B illustrates free-wheeling loops shown in the schematic of an MMC dual cell with integrated DC choppers and dump-load resistors according to one or more embodiments described in this present disclosure.
Figure 4A:
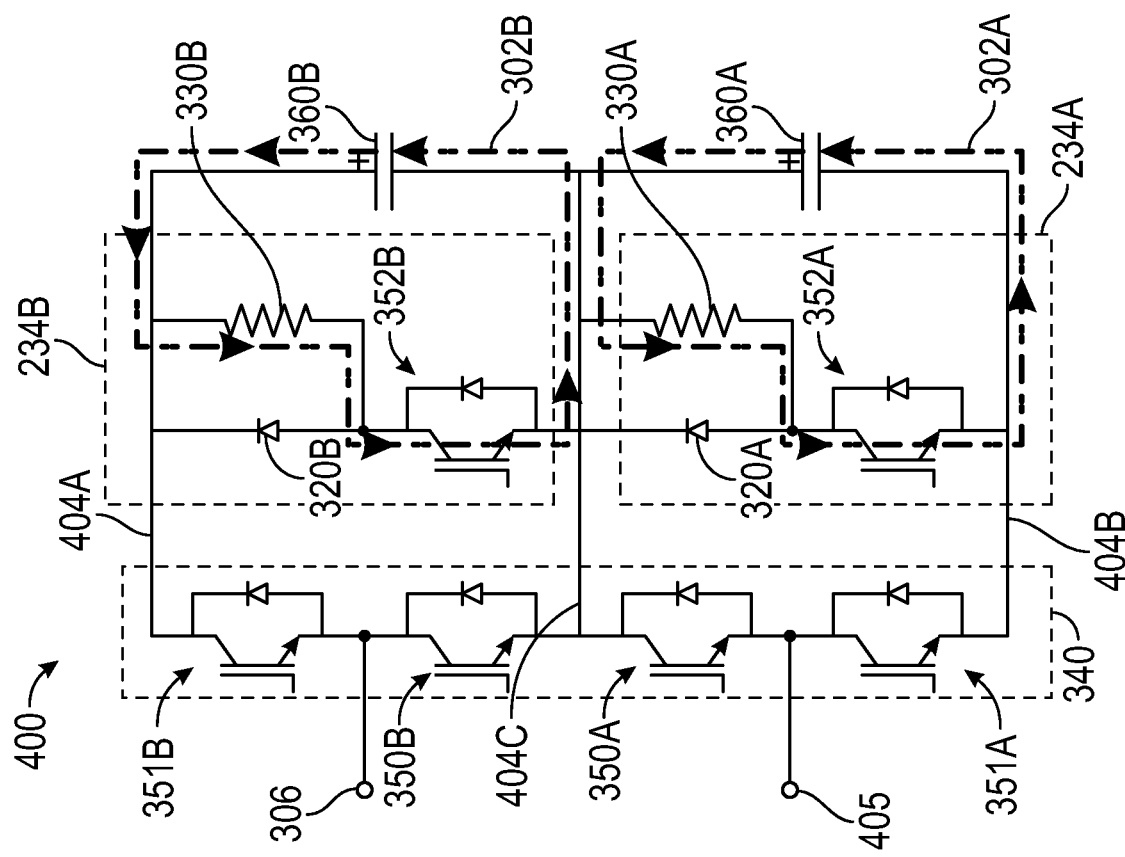
FIG. 4A illustrates discharge loops shown in the schematic of an MMC dual cell with integrated DC choppers and dump-load resistors according to one or more embodiments described in this present disclosure.

FIG. 4A shows an electrical schematic for an MMC dual cell 400 which is one example of the MMC cell 215 in FIG. 2C according to an embodiment. The MMC dual cell 400 is arranged in a series half-bridge configuration and includes a dual-cell input 405 and a dual-cell output 406, four main switches 340 (e.g., switches 350A, 350B, 351A, 351B), two integrated DC choppers 234A, 234B and two MMC cell capacitors 360A, 360B. Referring back to the MMC single cell 300 illustrated in FIG. 3A, the MMC dual cell 400 can generally be fashioned by stacking two MMC single cells 300 on top of each other such that the two cells share a common rail. Specifically, the upper cell voltage rail 304A of the first stacked MMC single cell 300 (bottom) and the lower cell voltage rail 304B of the second stacked MMC single cell 300 (top) become the shared center cell voltage rail 404C. Likewise, the upper cell voltage rail 404A of the MMC dual cell 400 corresponds to the upper cell voltage rail 304A of the second stacked MMC single cell 300. And the lower cell voltage rail 404B of MMC dual cell 400 corresponds to the lower cell voltage rail 304B of the first stacked MMC single cell 300. The dual-cell output 406 of MMC dual cell 400 corresponds to the output of the second stacked MMC single cell 300 (i.e., the voltage node between bypass switch 350B and insert switch 351B of the second stacked MMC single cell 300). However, unlike the cell input for MMC single cell 300 (the lower cell voltage rail 304B), the cell input of MMC dual cell 400 is the voltage node between the bypass switch 350A and insert switch 351A of the first stacked MMC single cell 300.

The two (inner) bypass switches 350A, 350B and the two (outer) insert switches 351A, 351B comprise the main switches 340 for the MMC dual cell 400. As discussed above with respect to FIG. 3A and MMC single cell 301 (FIG. 3C), MMC dual cell 400 may also be modified to substitute free-wheeling DIGBTs 355 illustrated in FIG. 3C for one or both of the free-wheeling diodes 320A, 320B. Likewise, MMC dual cell 400 may be modified to include bleed resistors placed in parallel with one or both of the MMC cell capacitors 360.

Similar to the MMC single cell 300 in FIGS. 3A-3B, the chopper switches 352A, 352B are controllable switches 256 (FIG. 2D) that are operated to control the voltage across each of the integrated DC choppers 234A, 234B (and the power dissipated) by varying the duty cycle of the chopper switches 352. As with the MMC single cell 300, the chopper switches 352 in the cell 400 are preferably controlled using pulse width modulation ("PWM"). When the MMC cell capacitors 360A, 360B are at least partially charged, current discharge paths, (e.g., the discharge loops 302A, 302B) may be used for discharging the MMC cell capacitors 360A, 360B. In particular, the discharge loop 302A includes a current discharge path for MMC cell capacitor 360A through the dump-load resistor 330A of the integrated DC chopper 234A, and the discharge loop 302B includes a current discharge path for MMC cell capacitor 360B through the dump-load resistor 330B of integrated DC chopper 234B. The discharge paths are enabled when their respective chopper switches 352A, 352B are turned on thus allowing a conducting current to flow through the chopper switches and their respective dump-load resistors. As discussed above for the single cell, when the chopper switch is turned off while there is current flowing in either of the discharge loops 302A, 302B, corresponding free-wheeling current discharge loops 303A, 303B (FIGS. 38, 48) are used to prevent possible Ldi/dt turn-off overvoltage damage to components.

In some embodiments, the discharge loop 302A and the discharge loop 302B may be operated simultaneously. However, in other embodiments, the discharge loop 302A and the discharge loop 302B may be operated separately or at different rates. For example, referring to the controllers 272 illustrated in FIG. 28, the phase/arm controller 274 may receive cell voltage measurements from the cell controllers 275 and may then determine a voltage difference between cell capacitor 360A and cell capacitor 360B and provide the PWM control, rates, and sequencing to the cell controllers 275 for discharging MMC cell capacitors 360A, 360B at rates to minimize the voltage difference.

Figure 5A:
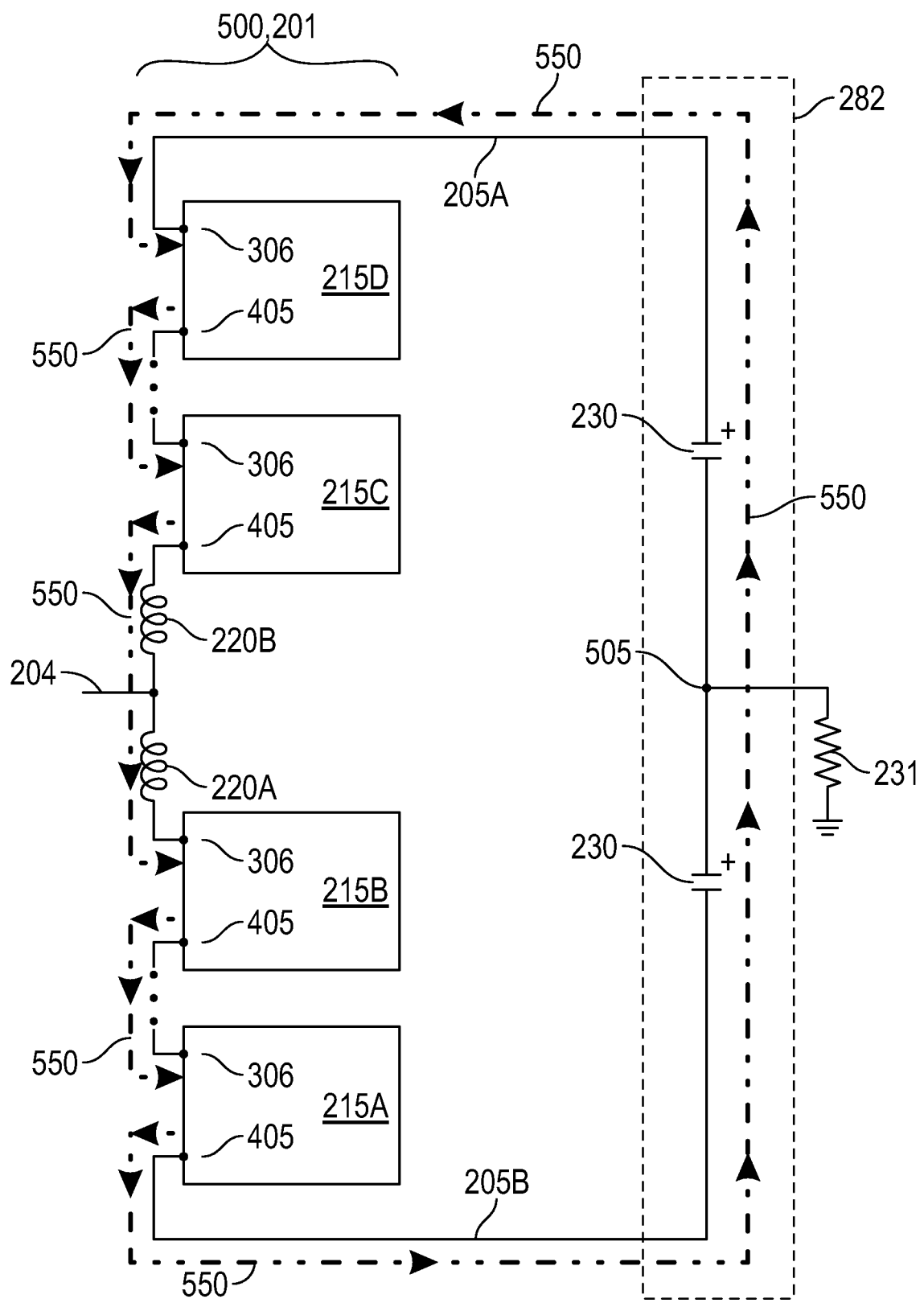
FIG. 5A illustrates a discharge leg loop shown in the schematic of an MMC phase leg for DC-link capacitors discharging according to one or more embodiments described in this present disclosure.

FIG. 5A is a schematic showing phase leg 500 connected to a DC-link 282. The phase leg 500 is substantially the same as the phase legs 201 shown in FIG. 2C, however the series connected MMC cells 215 and arm inductors 220 have been indicated individually as MMC cells 215A-215D and arm inductors 220A, 220B for convenience. The phase leg 500 is connected to the DC-link 282 via the upper DC-link voltage rail 205A and lower DC-link voltage rail 205B. Similar to the phase leg 201, the phase leg 500 has a lower phase arm that comprises arm inductor 220A, MMC cell 215B, and MMC cell 215A, all connected in series between AC input/output 204 and lower DC-link voltage rail 205B. Correspondingly, phase leg 500 has an upper phase arm that comprises arm inductor 220B, MMC cell 215C, and MMC cell 215D, all connected in series between AC input/output 204 and the upper DC-link voltage rail 205A. As with the phase legs 201, the phase leg 500 shows four MMC cells 215A-215D, however as indicated by the dotted connections between upper phase arm MMC cells 215D and 215C and between lower phase arm MMC cells 215B and 215A, indicating that each phase arm is not limited in the number of MMC cells 215 that may be included in the phase arm.

The DC-link 282 is similar to the DC-link 280 shown in FIG. 2B, having two DC-link capacitors 230 to store and maintain the DC voltage between the MSC 295 and the LSC 290. Two DC-link capacitors 230 may be connected to earth ground through an earthing resistor 231 at a common (neutral) DC-link voltage rail 505. The non-common terminals of the DC-link capacitors 230 are connected to DC-link voltage rails 205A, 205B. As with the DC-link 280, in some embodiments, the DC-link 282 may include a number of DC-link capacitors 230, may not use a common DC-link voltage rail 505, and may not have any earthing resistor 231.

Current discharge loop 550, is a leg loop that includes the phase leg 500 and DC-link 282. In particular, the discharge loop 550 runs from the DC-link 282 through the upper DC-link voltage rail 205A, through the upper phase arm MMC cells 215D and 215C, and through the upper arm inductor 220B. The discharge loop 550 continues through the lower phase arm of the phase leg 500, running through the lower arm inductor 220A and continuing through the lower phase arm MMC cells 215B and 215A to the lower DC-link voltage rail 205B which, in turn, completes the discharge loop where it connects back to the DC-link 282.

Figure 5B:
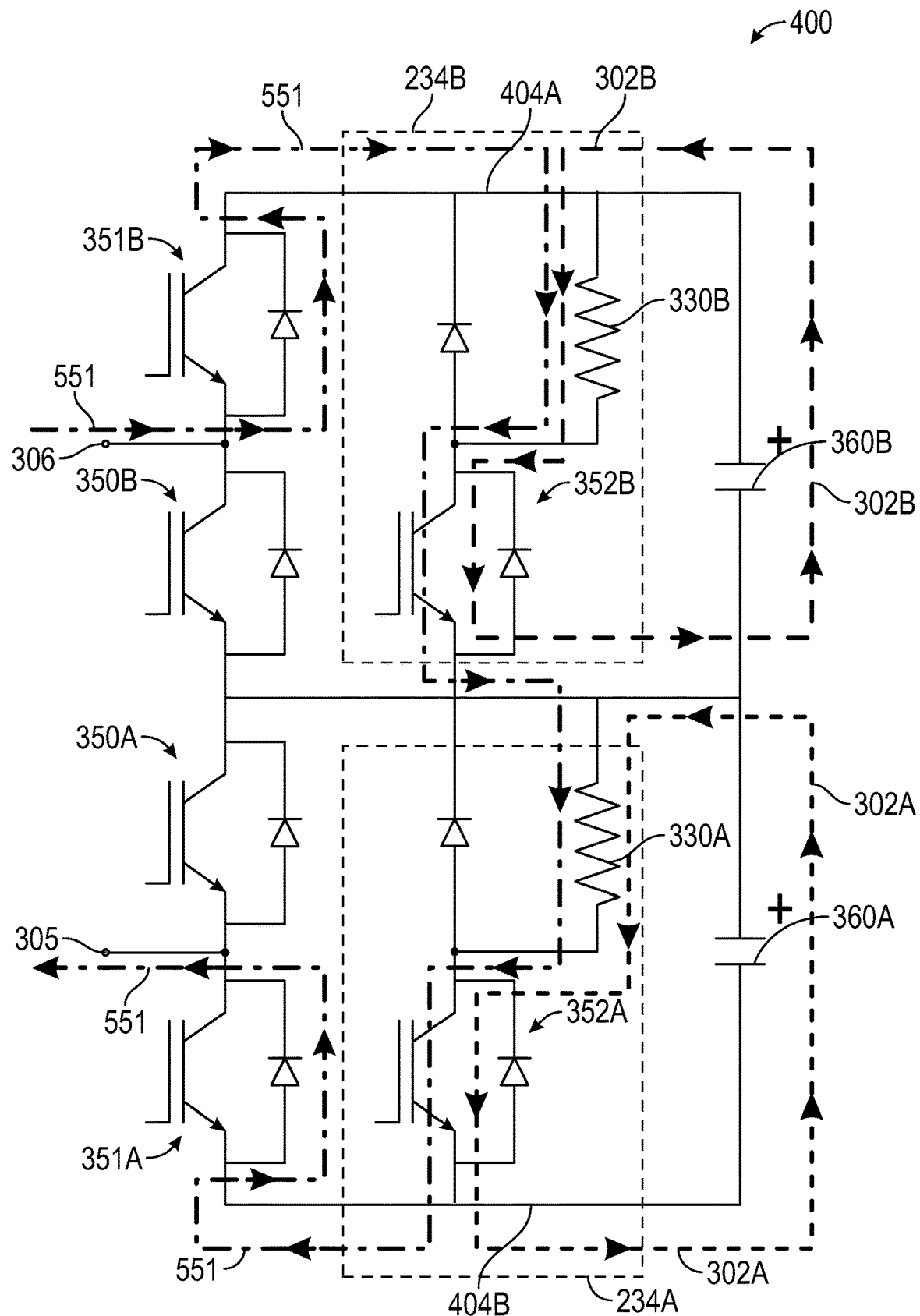
FIG. 5B illustrates an MMC cell discharge path configuration as used in a phase leg according to one or more embodiments described in this present disclosure.

FIG. 5B shows an MMC dual cell 400 as an example of one of the MMC cells 215A-215D in FIG. 5A. For the purposes of illustration, it may be assumed that MMC cells 215A-215D in FIGS. 5-11 are MMC dual cells 400, however the concepts discussed with respect to these figures also apply to MMC single cells 300 illustrated in FIG. 3A, a mixture of cell types, and in general to any combination of MMC cells 215 that have a half-bridge or cascaded half-bridge configuration.

Referring to FIGS. 5A-5B, MMC dual cell 400 is shown in schematic depicting a discharge path 551. Discharge path 551 is a cell loop current path (i.e., a path through the MMC cell that may form part of a larger discharge loop). In particular, discharge path 551 forms part of the discharge loop 550 that can be used to discharge both the DC-link capacitors 230 as well as MMC cell capacitors 360 as discussed further below. The discharge path 551 starts at the dual-cell output 406 and runs through the MMC dual cell 400 in a path including the dump-load resistors, to the dual-cell input 405.

In particular, FIG. 5B shows current flow of the discharge path 551 through MMC dual cell 400 starts at the dual-cell output 406 and runs through the anti-parallel diode 354 of insert switch 351B to the upper cell voltage rail 404A, then through the integrated DC choppers 234B and 234A (illustrated in FIG. 4A), that is, through the dump-load resistors 330 and DC chopper switches 352 of the integrated DC choppers 234, to the lower cell voltage rail 404B, and through the anti-parallel diode 354 of insert switch 351A to the dual-cell input 405.

Still referring to FIGS. 5A-5B, the MMC cell (e.g., MMC dual cell 400) is initially configured by the controller 272 to use the discharge path 551 by turning off the cell bypass switches 350A, 350B (i.e., configured to be in a non-conducting state) to prevent a direct current path short from the dual-cell output 406 to the dual-cell input 405. The discharge path 551 then forms part of the discharge loop 550 that can de-energize the DC-link 282 (e.g., discharge any charge stored in DC-link capacitors 230). A combination of the discharge path 551 and the discharge loops 302A and 302B can discharge the MMC cell capacitors 360.

In general, the discharge loop 550 is enabled when each MMC cell 215A-215D in the phase leg 500 are configured to have a DC current path from the dual-cell output 406 to the dual-cell input 405. In some embodiments, the path through each of the phase leg cells includes a path through the dump-load resistor 330 (e.g., discharge path 551) in the integrated DC chopper. However, this is not strictly required as is shown further below, though in some embodiments it is preferred that the discharge current is configured to travel through at least one of the dump-load resistors 330A, 330B in at least one of the integrated DC choppers.

According to some embodiments, accumulated charges in the entire DC-link 282 (e.g., the upper and lower DC-link capacitors 230) and in the MMC cell capacitors 360 can be discharged through the dump-load resistors 330 of the integrated DC choppers 234 when each the MMC cells 215A-215D in the phase leg 500 are configured to generate the discharge loop 550 and the discharge loops 302 when the DC chopper switch 352 is engaged (turned on) (preferably controlled using PWM).

Note that the MMC single cells 300 illustrated in FIG. 3A, may be configured and operated in substantially the same way as the MMC dual cell 400 according to substantially similar discharge paths. That is, the bypass switch 350A for MMC single cell 300 can be turned off to prevent shoot-through current from the cell output to the cell input and then the DC chopper switch 352 engaged (i.e., turned on) to dissipate charge from both the DC-link 282 and from MMC cell capacitors 360.

Category I De-Energization—Intelligent Discharge Using Integrated DC Choppers

Category I de-energization may apply to a normal discharge, for example, after a scheduled stop, before a service can take place. The controller 272 may also generally determine if and which MMC cells 215 and/or which cell components (e.g., integrated DC choppers 234, switches 350, 351, 352, diodes, etc.) are faulty, in order to select a specific discharging path out of some alternatives as described further below.

Figure 5C:
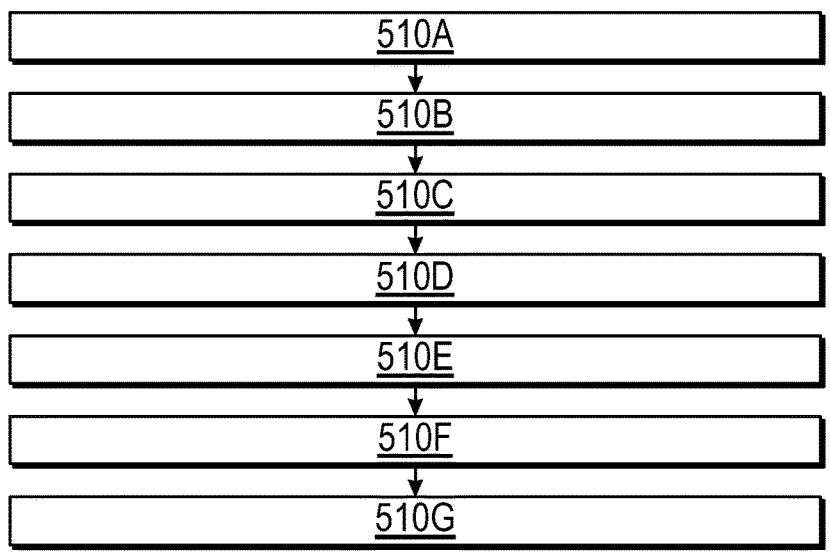
FIG. 5C illustrates a flowchart for de-energizing an MMC system according to one or more embodiments described in this present disclosure.

FIG. 5C shows a flowchart 501 comprising blocks of steps for de-energizing the MMC system according to a first category ("Category I") by discharging cell capacitors and also DC-link capacitors (if they exist) to safe voltage levels (e.g., <50v) relatively quickly. Note: blocks 510A-510G generally refer to the elements described in FIGS. 5A and 5B and the controller 272 illustrated in FIG. 2D.

At block 510A, the controller recognizes a system discharge event that triggers de-energizing the converter. This event may happen, for example, as a result of any number of situations such as detecting a system alarm, an MMC cell fault, a fault current, an over-voltage or under-voltage, a temperature limit, or following a maintenance request, inspection request, etc. The system discharge event is, of course, not limited to these examples.

At block 510B, the controller configures the bypass switches 350 and the insert switches 351 (i.e., main switches 340 illustrated in FIGS. 3A, 4A) within each MMC cell in a phase leg 201 (FIG. 5A) to route a discharge current through the integrated DC choppers 234 (FIG. 5B). For example, the bypass switches 350 are turned off for the MMC cell enabling discharge path 551 illustrated in FIG. 5B.

At block 510C, one or more duty cycles and cycle rates are determined to discharge the MMC cells and the DC-link within a prescribed time frame. For example, for the phase arm and DC-link of FIG. 5A using the MMC dual cell of FIG. 5B, a duty cycle for the DC chopper switches 352A, 352B may be calculated based on a predetermined discharge timeframe of 60 seconds and or more of: MMC cell configuration type, RC time constants, voltage of the DC-link, MMC cell capacitance, and discharge resistor values to discharge the MMC cell capacitors 360 and the DC-link capacitors 230.

Alternatively or additionally, the discharge current may be measured at a point along the discharge loop (e.g., at the arm inductors 220 for discharge loop 550 shown in FIG. 5A) for discharge current magnitude control and protection purposes. Furthermore, separate cycle rates (i.e., PWM rates) may be chosen to discharge the MMC cell capacitor(s) 360 of separate MMC cells 215. For example, for the phase arm and DC-link of FIG. 5A using a MMC single cell for MMC cell 215A and MMC cell 215D, and a MMC dual cell for MMC cell 215B and MMC cell 215C, a separate PWM rate may be used for each MMC cell configuration in the integrated DC choppers of the respective cells.

At block 510D (still referring generally to FIGS. 5A and 5B) the MMC cell capacitors 360 are discharged using integrated DC Chopper switches 352. The MMC cells in their respective phase legs are driven by its controller at the determined duty cycles and cycle rates.

In some embodiments, discharge paths may be enabled in a phased manner. The integrated DC Chopper switches 352 may then be operated in a pulsed manner (e.g., using PWM) to enable the cell capacitor discharge loops 302.

In some embodiments, the integrated DC chopper switches 352 in lower phase arm cells (e.g., MMC cells 215A, 215B) are held in a non-conducting state while the integrated DC chopper switches in upper phase arm cells (e.g., MMC cells 215C, 215D) are operated in a pulsed manner to discharge their MMC cell capacitors 360. After the MMC cell capacitors 360 in the upper phase arm have been sufficiently discharged (e.g., <50V) the integrated DC chopper switches in the upper phase arm are held in a non-conducting state while the integrated DC chopper switches in the MMC cells of the lower phase arm are operated in a pulsed manner to discharge the lower phase arm MMC cell capacitors 360.

In block 510E, a leg loop is uninhibited thus providing a discharge path for the DC-link through the uninhibited leg. In particular, each of the bypass switches 350 and the insert switches 351 (i.e., the main switches 340 illustrated in FIGS. 3A, 4A) in the MMC cells of a phase leg 201 (FIG. 5A) are turned off (i.e., driven to non-conducting states) and each of the DC-link chopper switches 352 (FIG. 5B) are turned on (held in conducting state) to force a DC-link discharge path, i.e., discharge loop 550, through only the anti-parallel diode 354 of the cell insert switches 351 and the integrated DC-choppers 234 illustrated in FIGS. 3A, 4A. For example, in discharge loop 550 illustrated in FIG. 5A, where each of the MMC cells 215A-215D is configured according to the discharge path 551 illustrated in FIG. 5B. The discharge path 551 starts at the dual-cell output 406 of the MMC cell 215 and exits the cell input 405 of the MMC cell 215. The DC-link 282 may thus be discharged through phase leg 500 via the combination of phase leg discharge loop 550 and discharge paths 551.

The controller 272 illustrated in FIG. 2D configures all of the integrated DC chopper switches 352 (shown in FIG. 5B) in the phase leg 201 (shown in FIG. 5A) to be held in a conducting state while discharging the DC-link capacitors 230 illustrated in FIG. 5A. For example, the controller 272 turns on the integrated DC chopper switches 352 to provide a path for current to discharge both the DC-link capacitors 230 and the MMC storage capacitors, i.e., cell capacitors 360A, 360B, through the DC chopper dump-load resistors 330A, 330B for each of the MMC cells 215 in the phase leg 500 and for each phase leg 201 in the MMC 200.

In block 510F, discharge currents and/or voltages are monitored to verify both the MMC cell capacitor(s) 360 and the DC-link 282 discharge to a pre-determined safe level (e.g., <50V). If not sufficiently discharged, pulsing at block 510D may continue. Additional checks may be performed at this stage to determine if one or more of the phase leg cells and/or cell components are faulty. If a faulty component is detected, one or more of category IV discharge methods may be performed.

In block 510G, the controller (e.g., the main controller 273 in FIG. 2B) may provide an indication (e.g., illuminate a green light) that the converter and/or DC-link are de-energized and safe for physical interface.

Category II De-Energization—Protection Against Over-Voltages

For category II de-energization, the cell voltage rails 304, 404 (FIGS. 3A, 4A) can be kept between a lower and upper threshold (e.g., 125%-130%) with respect to a nominal voltage using hysteresis control and/or PWM control.

For protective discharging to prevent overvoltage stresses, the integrated DC chopper switches 352 illustrated in FIGS. 3A and 3B will be turned on (in a conductive state) either continuously or with PWM, beginning when the cell voltage is detected to exceed a critical voltage upper threshold and lasting until the cell voltage is detected to fall below a critical voltage lower threshold.

To detect the cell voltages, for example, referring to FIG. 4D, the cell controller 275 may monitor the cell voltage continuously and provide feedback to the phase/arm controller 274. For example, the cell voltages (including cell capacitor voltages) may be measured by the controller 272 using resistive voltage dividers with non-isolated op-amps, isolated op-amps, hall-effect voltage sensors, or electronic voltage transformers.

In some embodiments, the protective discharging includes discharging the cell capacitors below critical voltages (e.g. below 125% of a rated cell voltage) for protection purposes during normal operation, in case over-voltages (e.g., cell capacitor voltages above 130% of rated cell voltage) might occur, to save life of capacitors and to reduce the risk of voltage sensitive equipment failure (such as power semiconductors, DC/DC converters, etc.).

Figure 5D:
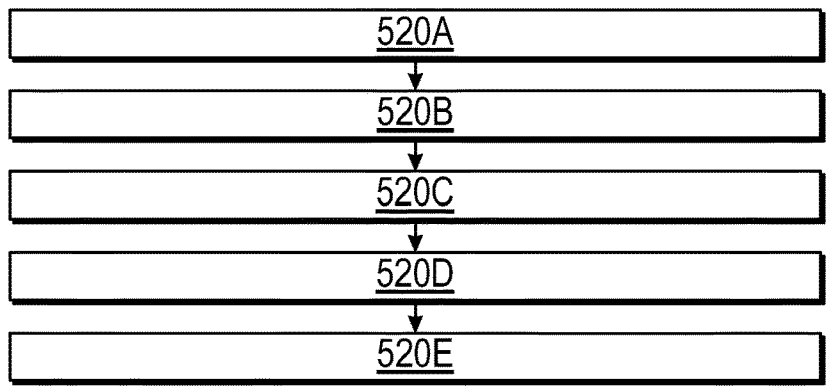
FIG. 5D illustrates a flowchart for protection against over-voltages in an MMC system according to one or more embodiments described in this present disclosure.

FIG. 5D shows a flowchart 502 showing an operation for protection against over-voltages in an MMC equipped with integrated DC choppers according to the following blocks of steps:

In block 520A, the controller continuously monitors the MMC cell voltages in an MMC and, in response to detecting a cell voltage above a pre-determined critical voltage upper threshold value, configures the MMC cell to route a discharge current through the integrated DC choppers 234.

For example, the cell controller 275 shown in FIG. 2D may send a signal to a higher order controller (e.g., phase/arm controller 274 and/or main controller 273) and configures the main switches 340 and DC chopper switches 352 (FIGS. 3A, 4A) within each MMC cell in a phase leg to route a discharge current through the integrated DC choppers 234 such as illustrated in FIG. 5C.

In block 520B, the integrated DC chopper switches are driven either continuously or with PWM in a MMC cell capacitor discharge loop (e.g., discharge loop/loops 302 illustrated in FIGS. 3A, 4A). The integrated DC chopper switches are thus controlled in a chopper discharge mode (e.g., as in block 510D).

In block 520C, the controller continues to monitor the MMC cell voltage and at block 520D, and responds to detecting a cell voltage below a pre-determined voltage threshold as in block 520E.

In block 520E, the integrated chopper switches are driven by the controller into free-wheeling current discharge loops 303 illustrated in FIGS. 3B, 4B. The MMC cell voltage is again monitored as in block 520A.

Category III De-Energization—Dumping Machine Side Power

Similar to Category II, the voltages in Category III de-energization can be kept in a predetermined range (e.g., 110%-120% of their nominal voltage) while dissipating the machine side power (i.e., power coming from the turbine). For example, the controller may, in response to an indication of an anomalous grid condition, configure the MMC converters for dumping the rated turbine power into the integrated DC chopper cell dump-load resistors 330 shown in FIGS. 3A, 4A. Such anomalous conditions may include, for example, detecting or receiving a signal indicating: loss of grid connection or loss of one or more grid phases in general, very high over-voltage or under-voltage in one or more phases, etc. Under normal operating conditions, power from the generator, MSC, and LSC, should be sunk into the grid, with the written order. However, in conditions where the grid may not be able to accept all of the power, the excess power may be dissipated on the dump-load resistors 330 until, for example, the blades are arranged and the rotor is braked to stop or reduce turbine power production, which may take seconds.

In some embodiments, a predetermined turbine power, for example a number of seconds of rated power, is dumped. Although, there may be advantages to dumping the turbine power over as many resistive elements as possible, this is not a requirement and due to factors such as the proximity or temperature of certain dump-load resistors 330 illustrated in FIGS. 3A, 4A within the converter system, the turbine power may be dissipated over any number of selected cell dump-load resistors 330 (e.g., the integrated DC chopper dump-load resistors in each of the MMC cells in the LSC shown in FIG. 2B).

The design (total power and energy rating) of integrated DC chopper resistors 257 illustrated in FIG. 2D (e.g., dump-load resistors 330 shown in FIGS. 3A, 4A) may be made according to a worst-case dumping. Further, the dissipation of the generator power may either be distributed into all the integrated DC chopper resistors in LSC 290 and MSC 295 shown in FIG. 2B, or a subset of those resistors may be selected for dumping depending on how severe and long a grid disconnection is, though care should be taken that loading and temperature limits are observed. In some embodiments, the controller can select certain chopper resistors 257 to exclude from dumping for that specific situation. For example, only dump-load resistors 330 from either the LSC 290 or MSC 295 may be selected for dissipation of the generator power. This might be favorable, for example, when there are different dump-load resistor temperatures at that instant.

To dissipate the generator power, the controller may configure the selected integrated DC choppers to dissipate the rated generator power for two seconds followed by a linear decrease to zero power in three seconds.

In some embodiments, the power dumping also includes applying a hysteresis as cell voltages drop to levels low enough to cause problems for operation. In other words, when the cell voltage drops below a pre-determined threshold Vdl-lo the integrated DC chopper is stopped until the cell voltage rises above a higher threshold Vdl-up thus keeping the cell voltages between the upper and lower limits.

In some embodiments, the hysteresis is applied in conjunction with a PWM high duty-cycle switching mode applied to the integrated DC choppers where restrictions to period, blanking time, and frequency limitations of the integrated chopper may also be integrated into to the dumping operation.

Figure 5E:
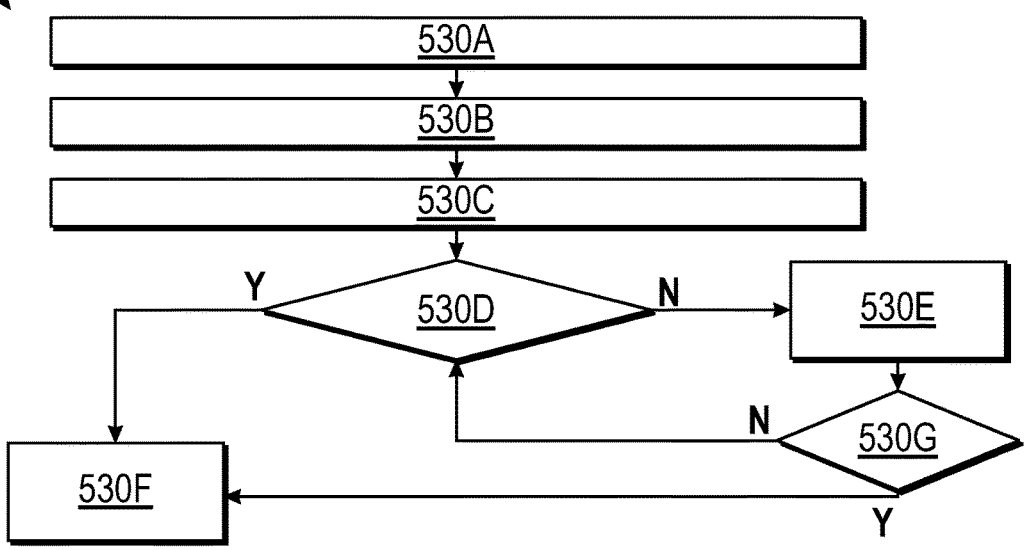
FIG. 5E illustrates a flowchart for dumping machine-side power in an MMC system according to one or more embodiments described in this present disclosure.

FIG. 5E is a flowchart 503 comprising blocks of steps showing the power dumping operation for the Category III de-energization process (i.e., dumping produced machine side or generator power through the integrated DC choppers).

In block 530A, the controller continuously monitors the system and grid for anomalous conditions. In response to detecting the anomalous condition, in block 530B, the controller selects which integrated DC chopper resistors will dump the produced power and determines their corresponding integrated DC choppers to activate.

In block 530C, the generator power is actively being dumped by the selected DC chopper dump-load resistors 330 (FIGS. 3A, 4A). In one embodiment, the generator power is dumped using the selected resistors 330 when a cell voltage is sensed to be above a pre-determined upper threshold voltage (Vdl-up). In particular, the DC chopper switches 352 for the integrated DC choppers 234 selected in block 530B are driven according to the discharge loop 302 discharge path illustrated in FIGS. 3A, 4A) and the controller continuously monitors the MMC cell voltages at block 530D. In one embodiment, one or more duty cycles for PWM control of the selected integrated DC choppers is determined for dumping the generator power. The corresponding DC chopper switches 352 (FIGS. 3A, 4A) are controlled to be driven in a chopper discharge mode (e.g., as in block 510D of FIG. 5C) in accordance with the pre-determined duty cycle and the controller continuously monitors the MMC cell voltages at block 530D.

In block 530D, the controller determines whether the cell voltage that was previously above the upper threshold voltage Vdl-up falls below a pre-determined lower threshold voltage (Vdl-lo) in response to dumping the generator power. If yes, the dumping operation is halted in block 530F. If the controller determines that the cell voltage remains above the lower threshold voltage Vdl-lo then the dumping operation is continued in block 530E.

In block 530G, the controller determines whether the anomalous conditions in the grid detected at block 530A (e.g., a grid fault) has cleared. If not, the method returns to block 530D where the controller again determines whether the cell voltage has fallen below the Vdl-lo threshold in response to performing the dumping operation. However, if the anomalous condition on the grid has been resolved, the method instead proceeds to block 530F where the dumping operation is halted. That is, if anomalous conditions are resolved, the dumping operation can cease immediately without waiting until the cell voltage has fallen below the Vdl-lo threshold. In one embodiment, the controller ceases the dumping operation by configuring the selected integrated DC choppers 234 according to free-wheeling current discharge loops 303 (FIGS. 3B, 4B).

After determining in block 530D that the cell voltage has fallen below the Vdl-lo threshold, it may be possible that the anomalous conditions in the grid may again cause the cell voltage to rise above the Vdl-up threshold. Thus, in one embodiment, if the anomalous condition has not yet been resolved, the controller can continue to monitor the cell voltage to ensure it does not rise above the Vdl-up threshold. If it does, the method in FIG. 5E can repeat. Put differently, after the cell voltage falls below the Vdl-lo threshold and the controller ceases the dumping operation at block 530F, the controller can continue to monitor the cell voltage and again start the dumping operation at block 530C if the cell voltage rises above Vdl-up.

Category IV De-Energization—Faulty Hardware Conditions

In general, category IV de-energization applies to intelligent discharging of a faulty MMC converter system (i.e., a converter system 260 illustrated in FIG. 2B comprising an MMC 200 illustrated in FIG. 2C), where MMC cell faults or faulty circuit components (e.g., defective components) are detected. MMC cell faults include MMC cells with faulty circuit components (e.g., faulty integrated DC choppers, switches, resistors, capacitors, diodes, connections, etc.). In such faulty conditions, normal de-energization techniques may be inadequate or may not be possible. Category IV de-energization then may be utilized taking into account the type of faulty cells/components and/or the location of the faults.

Failed cells may have damaged integrated DC choppers or main switches which may, for example, be due to a semiconductor (e.g., IGBT) being open circuited or its gate damaged, or the control circuitry not functioning, or the communication signal being lost between the semiconductor and cell controller, and so forth. However, even if the integrated DC choppers and/or the main switches are faulty, the anti-parallel diodes 354 of the main switches 340 illustrated in FIGS. 3A, 4A as well as other cell components may be healthy, including the physical connections of laminated busbars, DC busbars and AC busbars inside the power stage. Also, if only the integrated DC choppers are damaged, but the DIGBTs of the main switches of the MMC cell are healthy, then those devices may also be used to provide means for discharge, as described further below.

In some embodiments, the converter system 260 comprises six MMC phase legs 201 (e.g., three phase legs in each of the LSC 290 and in the MSC 295) connected by a common DC-link 280, 282) (see FIGS. 2B, 5A). When all of the integrated DC choppers (in both upper phase arm 240A and lower phase arm 240B illustrated in FIG. 2C) in at least one of the six phase legs 201 (FIGS. 2C, 5A) are healthy, their DC-link capacitors 230 may be completely discharged together with all the MMC cell capacitors 360 illustrated in FIGS. 3A, 4A in that healthy phase. In other words, even if all the integrated DC choppers in the converter system are faulty except for one single "healthy" phase leg anywhere in the converter system, the integrated DC choppers in the phase leg can be used to discharge the DC-link capacitors. For example, referring to FIG. 5A, a phase leg 500 using MMC cells 215 may be configured such that the discharge loop 550 and the cell discharge loops 302 shown in FIGS. 3A, 4A are enabled at the same time following a normal stop (e.g., shutting down of the MMC under normal operating conditions or non-severe system faults). In this configuration, the DC-link capacitors 230 will start to discharge when all the MMC cell capacitors 360 (FIGS. 3A, 4A) are discharged to half of their nominal voltage because the DC-link sees the phase arm voltage rectified; whereas during discharging through discharge loop 550, the MMC cells 215 in a phase (the upper and lower phase arms in series) are subject to the DC-link voltage.

Figure 6A:
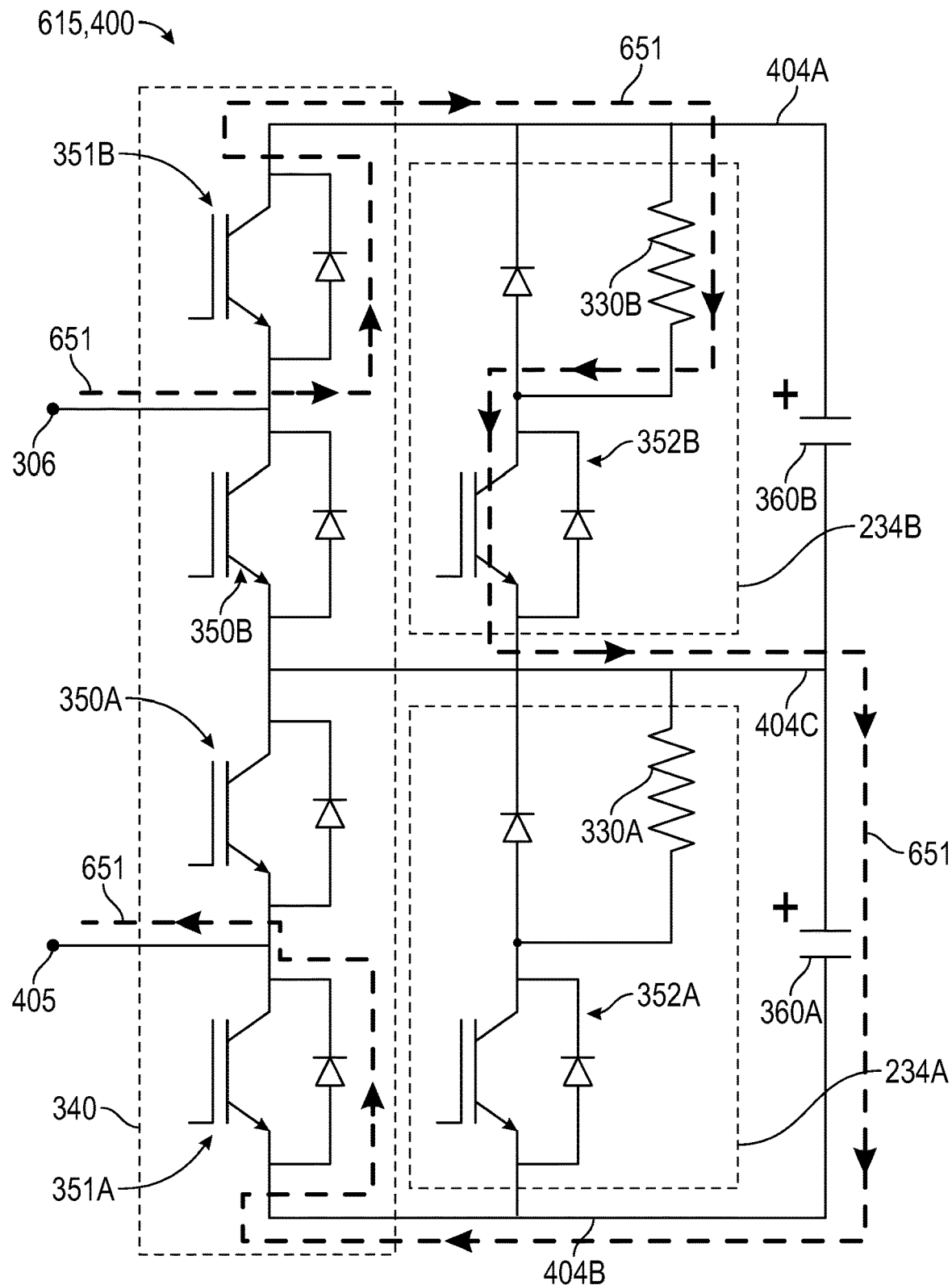
FIG. 6A illustrates a cell discharge path configuration for a faulty MMC cell as used in a discharge loop according to one or more embodiments described in this present disclosure.

FIG. 6A shows a faulty MMC dual cell 615 as an example of one of the MMC cells 215A-215D in FIG. 5A in the phase leg 500 connected to the DC-link 282. Referring to FIGS. 6A and 5A, the faulty MMC dual cell 615 is essentially the same as MMC dual cell 400 illustrated in FIG. 4A, but having a faulty integrated DC chopper 234A. In particular, it is assumed the integrated DC chopper 234A shown has a faulty DC chopper switch 352A (i.e., a faulty circuit component). FIG. 6A also shows a discharge path 651 that may be used as part of the discharge loop 550 in phase leg 500 illustrated in FIG. 5A, where one of the MMC cells has the faulty integrated DC chopper switch 352A (i.e., faulty MMC dual cell 615). As described further below, the discharge path 651 is a cell loop current path (i.e., a path through a configured MMC cell that forms part of a larger loop such as discharge loop 550) that includes the integrated DC chopper dump-load resistor 330B and may be used to discharge both DC-link capacitors 230 (FIG. 5A) and MMC cell capacitors 360 (FIG. 6A) notwithstanding the faulty circuit component in faulty MMC dual cell 615.

The faulty MMC dual cell 615 is configured to have a discharge current flow (i.e., discharge path 651) that starts at the dual-cell output 406 and runs through the anti-parallel diode of insert switch 351B to the upper cell voltage rail 404A, then through the integrated DC chopper 234B (i.e., through the dump-load resistor 330B and chopper switch 352B), to the lower cell voltage rail 404B through MMC cell capacitor 360A, and then through the anti-parallel diode of insert switch 351A to the dual-cell input 405. To enable the discharge path 651, the faulty MMC dual cell 615 is initially configured by the controller turning off the cell bypass switches 350A, 350B (i.e., configured to be in a non-conducting state) to prevent a current short of the discharge loop 550 (shown in FIG. 5A) from the dual-cell output 406 directly to the dual-cell input 405, and turning on the chopper switch 352B (i.e., configured in a conducting state) to direct the discharge current through the DC chopper dump-load resistor 330B.

Referring to FIGS. 6A and 5A, systems where there are no phase legs 500 that are fully healthy, for example, when phase leg 500 has a faulty MMC such as faulty MMC dual cell 615 which has one faulty integrated DC chopper (faulty DC chopper switch 352A is a faulty circuit component), the DC-link 282 may still be partially discharged via discharge path 651. The partial discharge of the DC-link may be in such a way that the discharging current of the DC-link capacitors 230 (FIG. 5A) will be charging the cell capacitor 360A (FIG. 6A) because the current enters from the positive terminals of the MMC cell capacitor 360A as seen in discharge path 651. The discharging of the DC-link capacitors 230 (and charging of MMC cell capacitor 360A) thus continues until the voltages of the cell capacitor 360A and DC-link 282 are generally equal.

If more than one integrated DC chopper is faulty in the healthiest of the phase legs, then the discharging/charging will be very similar to above except the final voltage on the DC-link capacitors 230 will be equal to the series connection voltage of two or more cell capacitor voltages instead of one which may cause a higher final voltage of DC-link. However the number of faulty integrated DC choppers may be so high that the total series cell voltages summed up in the operating (i.e., healthiest) phase leg is higher than the DC-link voltage, thus preventing discharge of the DC-link. This may happen, for example, if more than half of the DC choppers are faulty.

In faulty systems where more than one phase leg 500 has working integrated DC choppers, then the phase leg having the highest number of healthy integrated DC choppers will dictate what the final voltage of DC-link will be, as described above. If there are phase legs with the same number of healthy integrated DC choppers, then those phase legs may operate in parallel to partially discharge the DC-link capacitors 230.

Figure 6B:
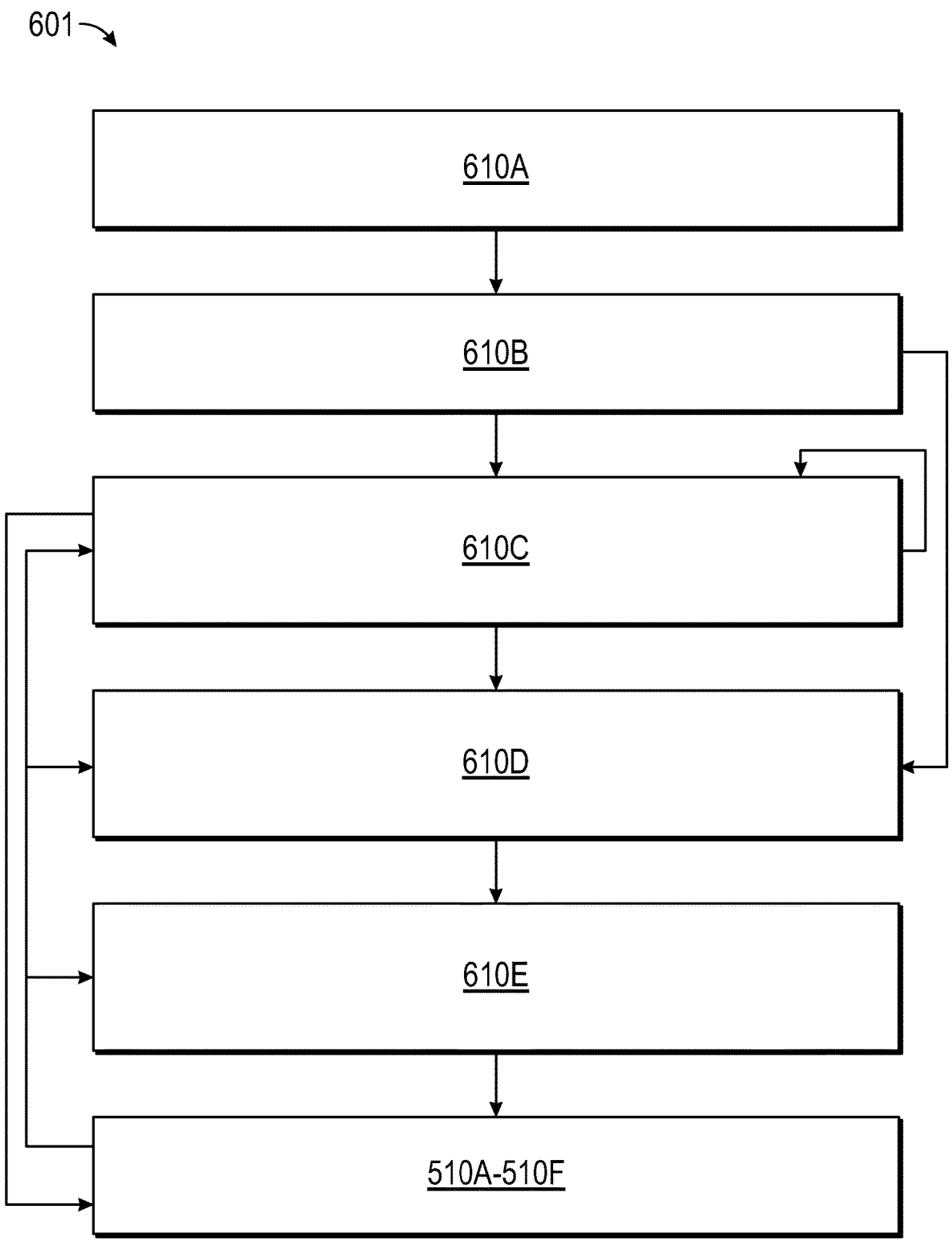
FIG. 6B illustrates a flowchart for de-energizing an MMC system with a faulty MMC cell according to one or more embodiments described in this present disclosure.

FIG. 6B is a flowchart 601 showing a category IV de-energization in a power converter system having a DC-link connected MMC with integrated DC choppers 234 illustrated in FIG. 6A. The de-energization comprises steps in the following blocks:

In block 610A, the controller monitors for and detects one or more MMC cell faults (i.e., MMC cells with faulty components or connections) and proceeds on as in block 610B.

In block 610B, the controller identifies at least one phase of one MMC (e.g., either MSC 290 or LSC 295 shown in FIG. 2B) in the converter system is not faulty (i.e., a healthy phase) and proceeds as in block 610C, and otherwise proceeds as in block 610D.

In block 610C, the controller proceeds as blocks 510A-510F illustrated in FIG. 6C, in the identified healthy phase. This block may be iterated (e.g., for a pre-determined number of iterations or until a pre-determined safe voltage (e.g., less than 50V) is reached).

In block 610D, the controller determines whether the total series cell voltages summed up in a phase leg is higher than the DC-link voltage and, if so, determines if other category IV de-energization processes (e.g., flowcharts 701, 801, 1001, 1101) may be used.

In block 610E, the controller determines the healthiest phase leg and proceeds to discharge as shown in blocks 510A-510F illustrated in FIG. 6C operating on the determined healthiest phase leg. Where the controller determines that more than one phases are equally as healthy as the healthiest phase, their discharge loops may be run (i.e., according to blocks 510A-510F) in parallel.

Figure 7A:
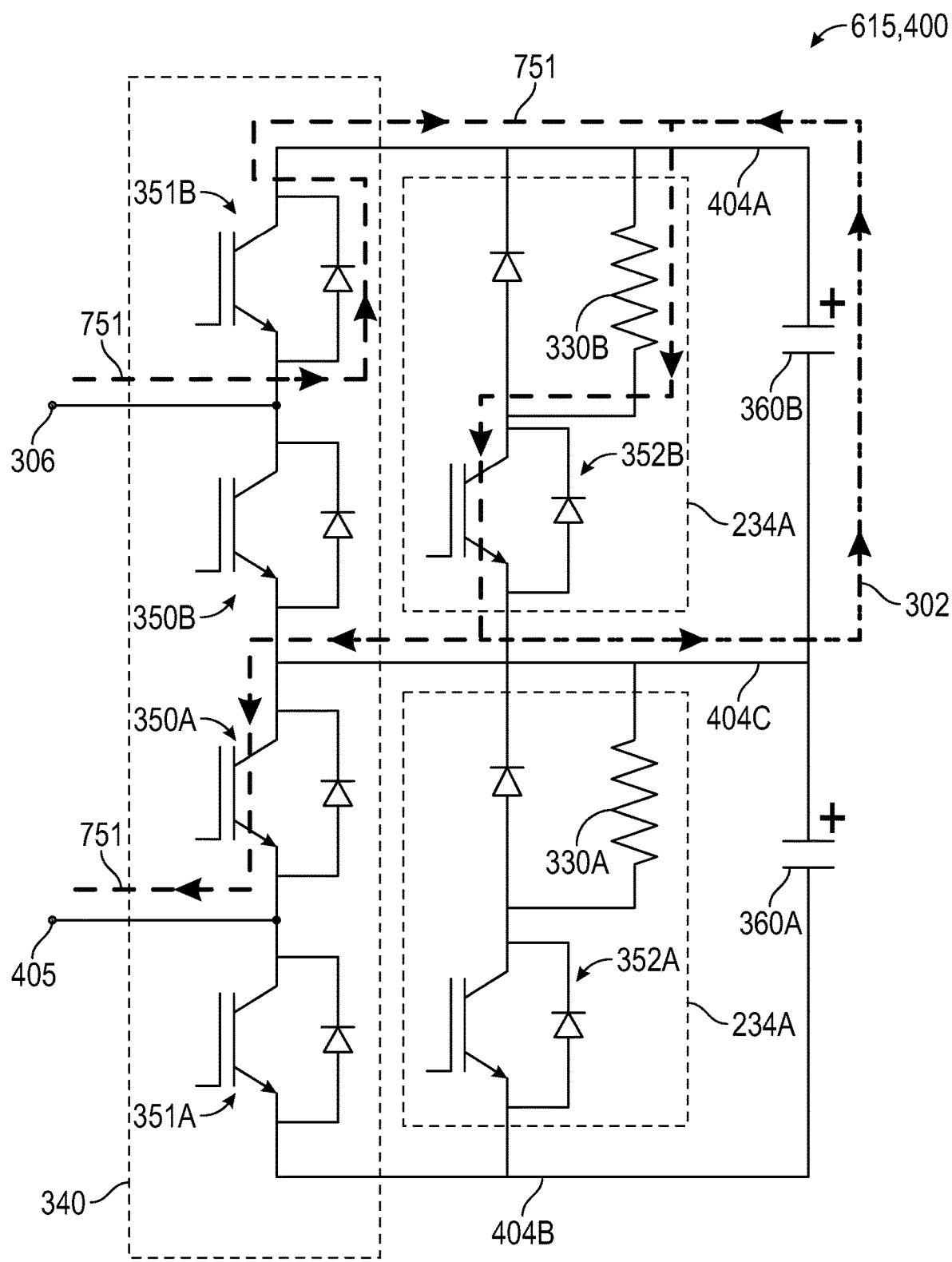
FIG. 7A illustrates a cell discharge path configuration a for a faulty MMC cell as used in a discharge loop according to one or more embodiments described in this present disclosure.

FIG. 7A shows a faulty MMC dual cell 615 which is essentially a MMC dual cell 400 as illustrated in FIG. 4A that has a faulty component (i.e., the chopper switch 352A). In particular, FIG. 7A shows a faulty MMC dual cell 615 configured to bypass the damaged portion of the cell by using a bypass path 751 as may be used in conjunction with current discharge loop 550 illustrated in FIG. 5A.

Figure 7B:
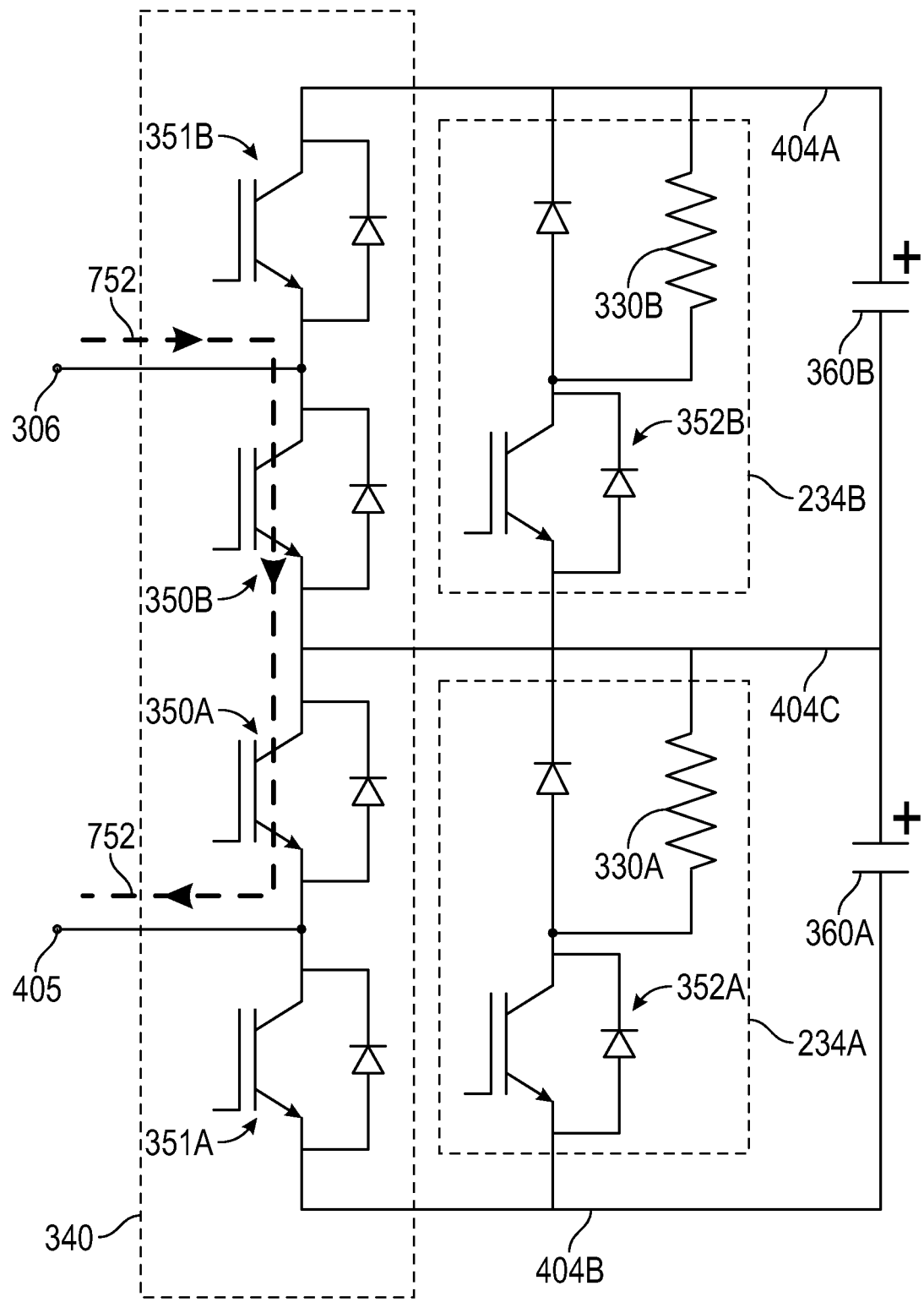
FIG. 7B illustrates a cell discharge path configuration a for a faulty MMC cell as used in a discharge loop according to one or more embodiments described in this present disclosure.

FIG. 7B shows an MMC dual cell 400 configured to use a bypass path 752 to bypass the entire MMC dual cell when both the choppers (or more specifically, when both the chopper switches 352A and 352A) are faulty. The bypass path 752 may be used in conjunction with current discharge loop 550 illustrated in FIG. 5A.

Referring to FIGS. 3A, 4A, in order to bypass an MMC cell capacitor 360 when an MMC cell is faulty because its integrated DC chopper 234 is not working, or avoid the specific cell's capacitor voltage being added up to the phase arm voltage (and hence to the DC-link voltage), that MMC cell capacitor 360 can be bypassed by switching on the bypass switches 350 In this way, even if not all of the MMC cells 215 can be discharged in phase leg 500 shown in FIG. 5A, the DC-link 282 can be discharged down to zero.

Regarding bypassing damaged MMC cells for the discharge loop 550 illustrated in FIG. 5A, if there are more than one MMC cells in a phase leg that has faulty or non-functioning integrated DC choppers (even if none of the integrated DC choppers in the phase leg function), it is possible to discharge the DC-link capacitors by creating a bypass of the faulty MMC cells in the discharge loop 550. Fast discharge and potentially oscillating behavior in the discharge loop 550 through an RLC circuit built up from the DC-link capacitors 230 in series with the two arm inductors 220 and the phase leg 500 as a result of the bypasses may be damped by providing appropriate equivalent resistances of the two arm inductors 220.

Figure 7C:
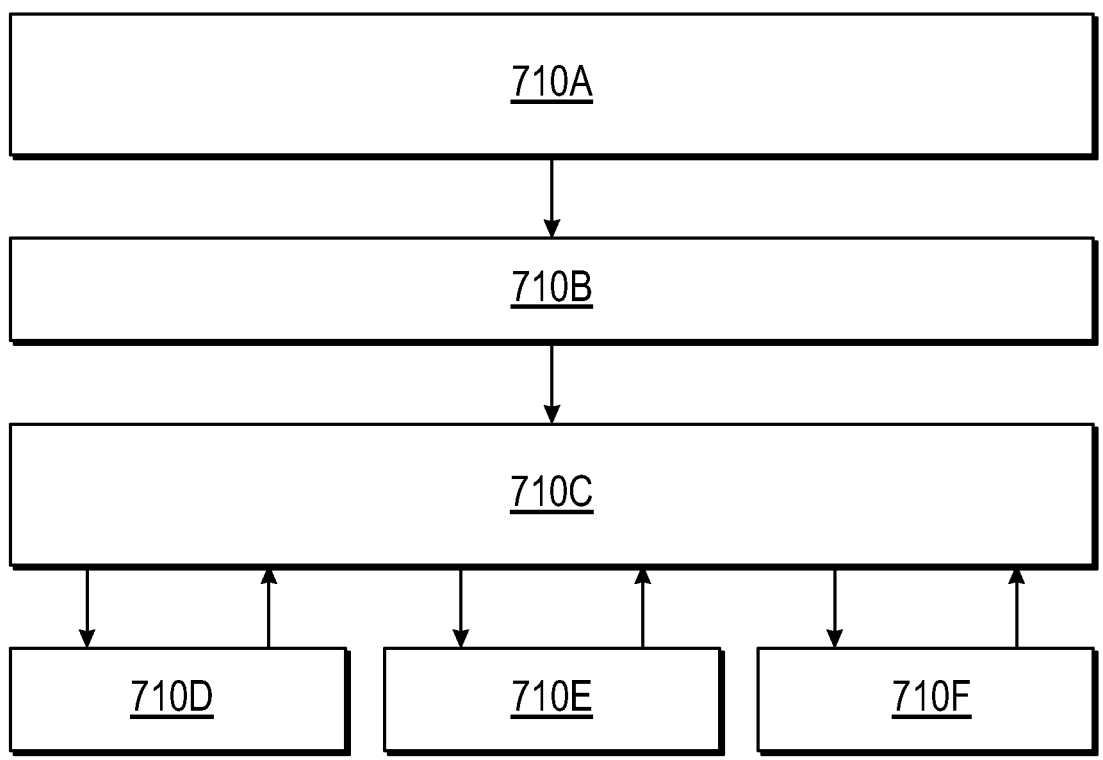
FIG. 7C illustrates a flowchart for de-energizing an MMC system with a faulty MMC cell according to one or more embodiments described in this present disclosure.

FIG. 7C is a flowchart 701 showing category IV bypass de-energization in a power converter system having MMC cells with integrated DC choppers 234 shown in FIG. 2B, comprising steps in the following blocks:

At block 710A, the controller monitors for and detects MMC cell faults. And in response to detecting at least one fault, proceeds as in block 710B.

At block 710B, the controller identifies the faulty MMC cells that contain faulty integrated DC choppers and/or, for MMC cells that comprise more than one integrated DC chopper 234, identifies the individual faulty integrated DC choppers.

At block 710C, the controller configures the faulty MMC cells to bypass one or more MMC cell capacitors 360 illustrated in FIGS. 3A, 4A, corresponding (e.g., that are parallel) to the faulty integrated DC choppers by performing one or more of the following blocks: 710D, 710E, 710F. This block may be iterated until all faults are bypassed.

In block 710D, for a faulty circuit component in an MMC cell, the controller activates the main switches 340 illustrated in FIGS. 3A, 4A, between the cell input and the cell output nodes, thus bypassing the entire MMC cell.

In block 710E, for MMC cells having one or more healthy integrated DC choppers (e.g., integrated DC chopper 234B illustrated in FIG. 7A), the controller configures all insert switches 351 associated with the faulty circuit component (e.g., insert switch 351A) and all bypass switches 350 associated with the non-faulty cell areas (e.g., bypass switch 350B) in a non-conductive state and activates the bypass switch 350 for the faulty circuitry component to form a discharge path through the cell (e.g., discharge path 751 as shown in FIG. 7A).

In block 710F, for MMC cells having no healthy integrated DC choppers, configuring all bypass switches 350 for the faulty cell in a conductive state (i.e., electrically connecting the cells input node to the cells output node) (e.g., discharge path 752 as illustrated in FIG. 7B).

According to some embodiments having a DC-link that employs capacitors whose midpoint is a DC-link voltage rail that is grounded through an earthing resistor 231, there is another way to de-energize the MMC system explained below with respect to FIGS. 8A, 8B, and 8C, that may increase lifetime of the components and avoid potential problems that may arise with regard to the bypass method described above.

Figure 8A:
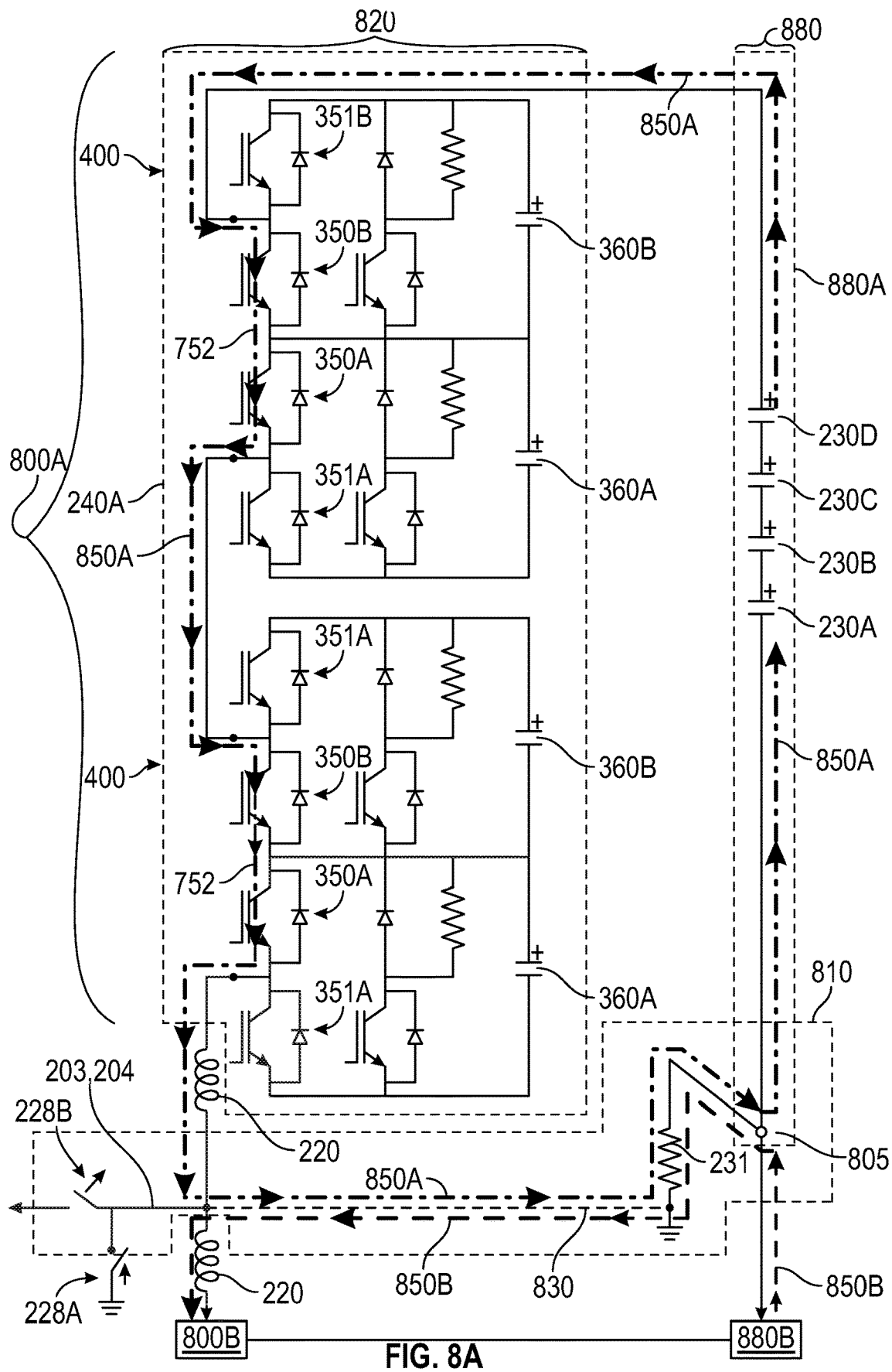
FIG. 8A illustrates discharge loops through an earthing resistor in a schematic of an MMC phase leg according to one or more embodiments described in this present disclosure.

FIG. 8A shows a phase leg 820 connected to a DC-link 880. For clarity, only the upper phase arm 800A of the phase leg 820 and the upper DC-link 880A is shown in detail. For simplicity of illustration, the lower phase arm 800B and the lower DC-link 880B are shown in block diagram and can be assumed to mirror the circuitry in upper phase arm 800A and upper DC-link 880 respectively. For simplicity of illustration, the phase arm 800A is shown to comprise two MMC dual-cells 400 though this is a non-limiting example and any number/type of cell may be used. In this non-limiting example, the upper DC-link 880A comprises four DC-link capacitors 230A-230D.

In the mid-point of the phase leg 820 is an AC input/output 204 connected to the earthing switch 228A and the circuit breaker 228B. DC-link 880 has a midpoint DC-link voltage rail 805 (e.g., common or neutral) that is grounded to earth through an earthing resistor 231 providing an earth connection 830 between the mid-point DC-link voltage rail 805 and the AC input/output 204 through the earthing switch 228A. The following de-energization method may be used to discharge DC-link capacitors in a transmission system 210 shown in FIG. 2A even if all of the integrated DC choppers 234 in any of the phase legs of both side converters (e.g., MSC 290, LSC 295 illustrated in FIG. 2B) are faulty.

First, the circuit breakers coupled to the MMC converters are opened. For example for the LSC 290, referring to FIGS. 2A and 8A, the circuit breaker 228B is opened thus removing a connection from the MMC phase leg 820 to the grid 293. Similarly, any circuit breakers coupled to other phase legs (not shown) are also opened. Additionally or alternatively, the wind turbine blades may be at a standstill. The AC input/outputs 204 are then grounded by the earthing switch 228A, as may generally be done before service. These actions create a discharge loop 850A for the DC-link capacitors 230 of upper DC-link 880A in the upper phase arm 800A when the MMC cells 400 are configured with a bypass path (e.g., cell discharge path 752 as shown in FIGS. 7B, 8B) (i.e., bypass switches 350 are turned on for each MMC cell 400 in upper phase arm 800A as illustrated in FIG. 7B). Note that in the schematic in FIG. 8A, discharge loop 850A runs counter clockwise from the earth connection 830 to the upper DC-link 880A.

Similarly, another discharge loop 850B that runs clockwise from the lower DC-link 880B through the earth connection 830 may be independently created with bypass switches in the MMC cells of the lower phase arm 800B for the lower DC-link capacitors 230 in the lower DC-link 880B. Note that the currents in discharge loops 850A, 850B run in opposite directions for the discharge of capacitors in the upper DC-link 880A and the lower DC-link 880B. Thus, a soft discharge may be attained by avoiding overlapping operation of the bypass switches in the upper phase arm 800A and the bypass switches in the lower phase arm 800B. Additionally, using these discharge paths through the earthing resistor 231 and earth connection 830 to provide a larger time constant than as may be provided by use of the arm reactor (e.g., arm inductor 220) resistance only.

Figure 8B:
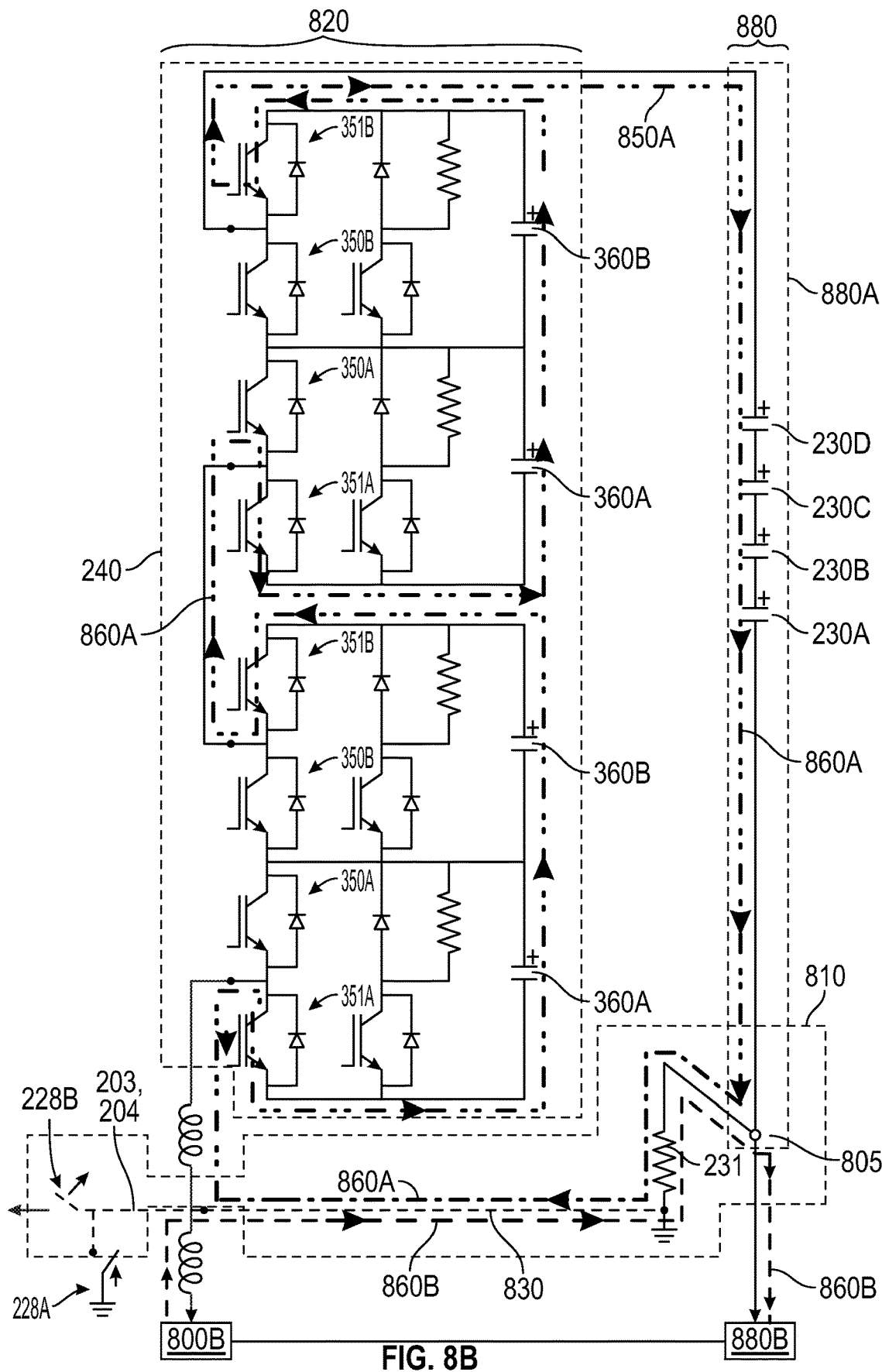
FIG. 8B illustrates discharge loops through an earthing resistor in a schematic of an MMC phase leg according to one or more embodiments described in this present disclosure.

FIG. 8B is the same as FIG. 8A except that the cells 400 in phase leg 820 are shown in a new configuration forming discharge loops 860A, 860B for de-energizing the MMC cell capacitors 360. Similar to the method for operating discharge loops 850A, the discharge loop 850B includes a loop through the earth connection 830 to discharge the DC-link capacitors 230. Additionally, by deactivating the bypass switches 350 and activating the insert switches 351 the MMC cell capacitors 360 can also be discharged over the earth connection 830 and earthing resistor 231 connected to the mid-point DC-link voltage rail 805.

Even if none of the integrated DC choppers within an MMC are healthy, the following steps using discharge loops 860A, 860B will provide a relatively soft discharge of the MMC cell capacitors 360 in phase leg 820. According to an embodiment, the circuit breaker 228B is opened and the earthing switch 228A at the AC input/output 204 is engaged. Then bypass switches and insert switches in the cells of a phase arm are operated consecutively (without overlap) separately for each phase arm (e.g., phase arms 800A, 800B). The bypass switch operation discharges the DC-link 880 through the earth connection 830 and earthing resistor 231 as explained above with respect to discharge loops 850A, 850B above. The insert switch operation will discharge the corresponding MMC cell capacitors 360 through earth connection 830 and earthing resistor 231 while also charging the corresponding DC-link capacitors 230, since they are also in the discharge loops 860A, 860B.

As with respect to the bypass configurations formed to use cell discharge path 752 discussed above, the cell insert configurations in upper phase arm 800A and lower phase arm 800B of the phase leg 820 (i.e., discharge loops 860A and 860B) should not be operated at the same time. In other words, in a cell, the insert and bypass switches should not be turned on at the same time thus short circuiting the cell capacitors over the IGBTs causing a large current to flow and possibly causing damage. Thus, loops 850A and 860A will preferably not be active at the same time. Likewise, loops 850B and 860B will preferably not be active at the same time. However, complementary configurations of leg currents (i.e., where common loop currents flow in the same direction) may be used. For example, the lower leg may use an insert loop 860B while the upper leg is configured to use bypass loop 850A.

Figure 8C:
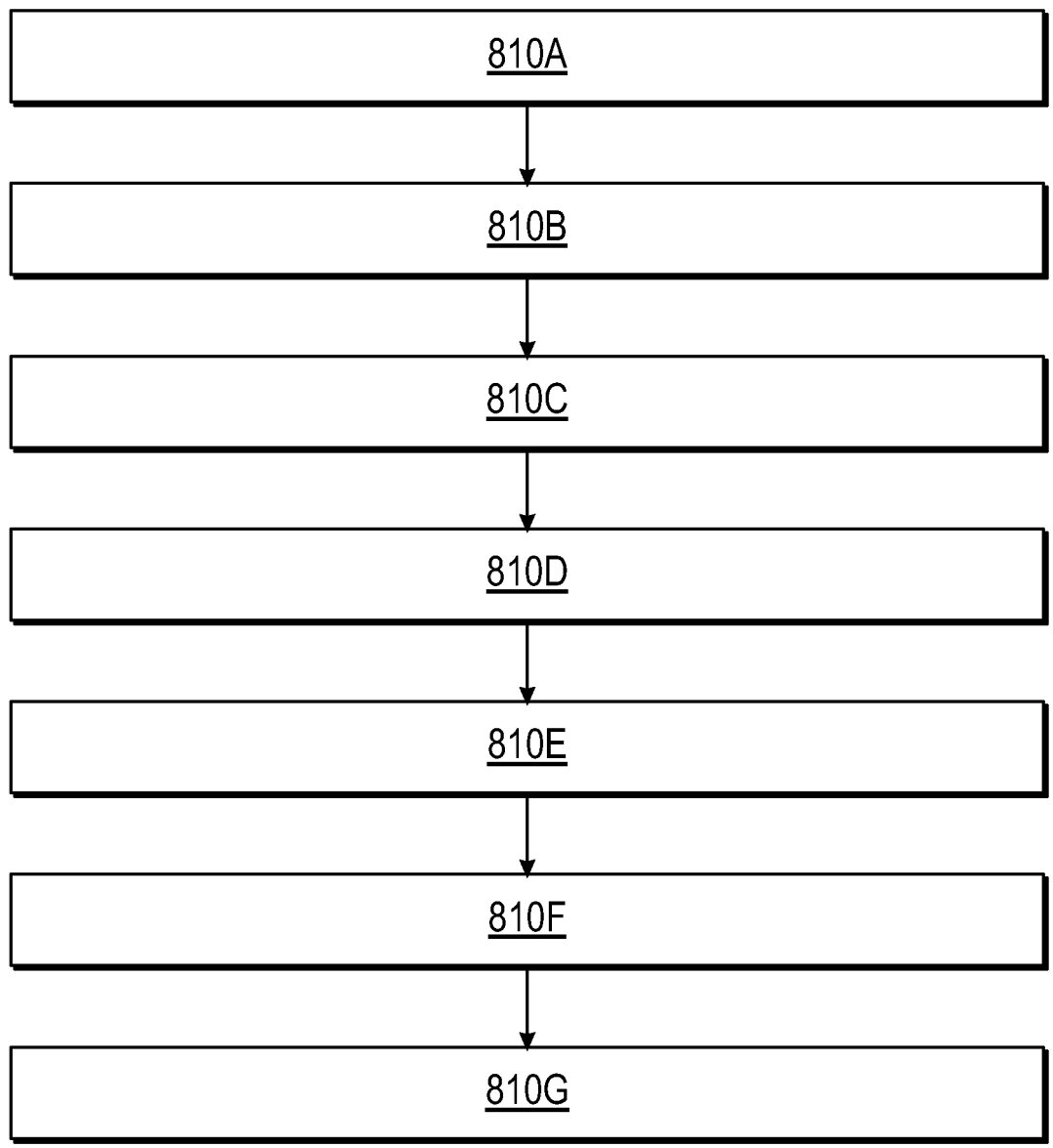
FIG. 8C illustrates a flowchart for de-energizing an MMC system through an earthing resistor according to one or more embodiments described in this present disclosure.

FIG. 8C is a flowchart 801 for a power converter system having DC-link capacitors 230 in a DC-link 880 grounded at the mid-point DC-link voltage rail 805 through an earthing resistor 231 as shown in FIG. 8A that illustrates category IV de-energization using an earth connection comprising steps in the following blocks:

In block 810A, a controller monitors for and detects MMC cell faults in a power converter system 260 having MMC cells with integrated DC choppers 234 illustrated in FIG. 2B.

In block 810B, circuit breakers that are connected to the AC input/output of an MMC are opened.

In block 810C, the AC input/output is grounded by engaging an earthing switch.

In block 810D, MMC cell bypass switches of the upper phase arm of a phase leg are engaged while not engaging cell bypass switches of the lower phase arm.

In block 810E, MMC cell bypass switches of the lower phase arm of a phase leg are engaged while inhibiting cell bypass switches of the upper phase arm.

In block 810F, MMC cell insert switches of the upper phase arm of a phase leg are engaged while inhibiting MMC cell insert switches of the lower phase arm.

In block 810G, MMC cell insert switches of the lower phase arm of a phase leg are engaged while inhibiting MMC cell insert switches of the upper phase arm.

Category IV de-energization using MMC cell bypass and insert switches may also occur where at least one integrated DC chopper throughout the phase is functioning and the main switches 340 illustrated in FIGS. 3A, 4A in the other cells are functioning. If the healthy integrated DC choppers are operated continuously (e.g., discharge loops 302A and 302B), and the main switches 340 of the MMC cells whose integrated DC choppers are faulty are operated without overlapping (i.e., insert and bypass switches are not taken into conduction at the same time) then, as illustrated in FIGS. 8A, 8B, the MMC cell capacitors 360 in the phase leg 820 and the DC-link capacitors 230 in the DC-link 880 can be discharged.

Figure 9C:
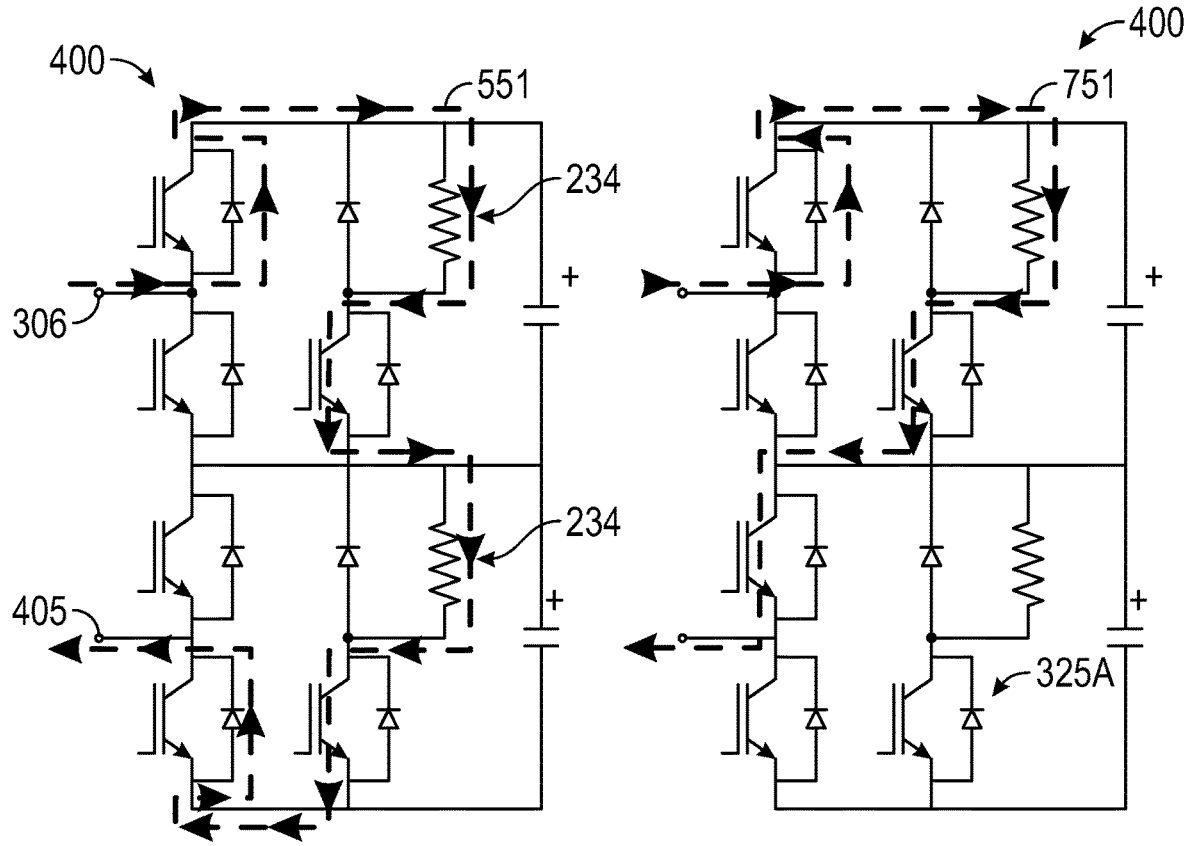
Figure 9C:
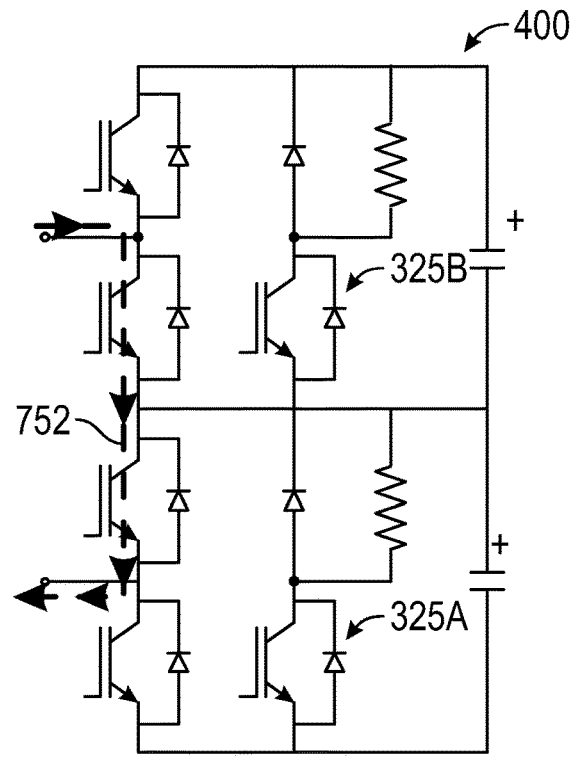

FIGS. 9A-9C show the cell current bypass discharge paths for MMC cells 400 for a healthy MMC cell (e.g., cell discharge path 551), an MMC cell with one faulty integrated DC chopper 352A (e.g., cell discharge path 751), and an MMC cell with two faulty integrated DC choppers 352A and 352B (e.g., cell discharge path 752) respectively.

Figure 10A:
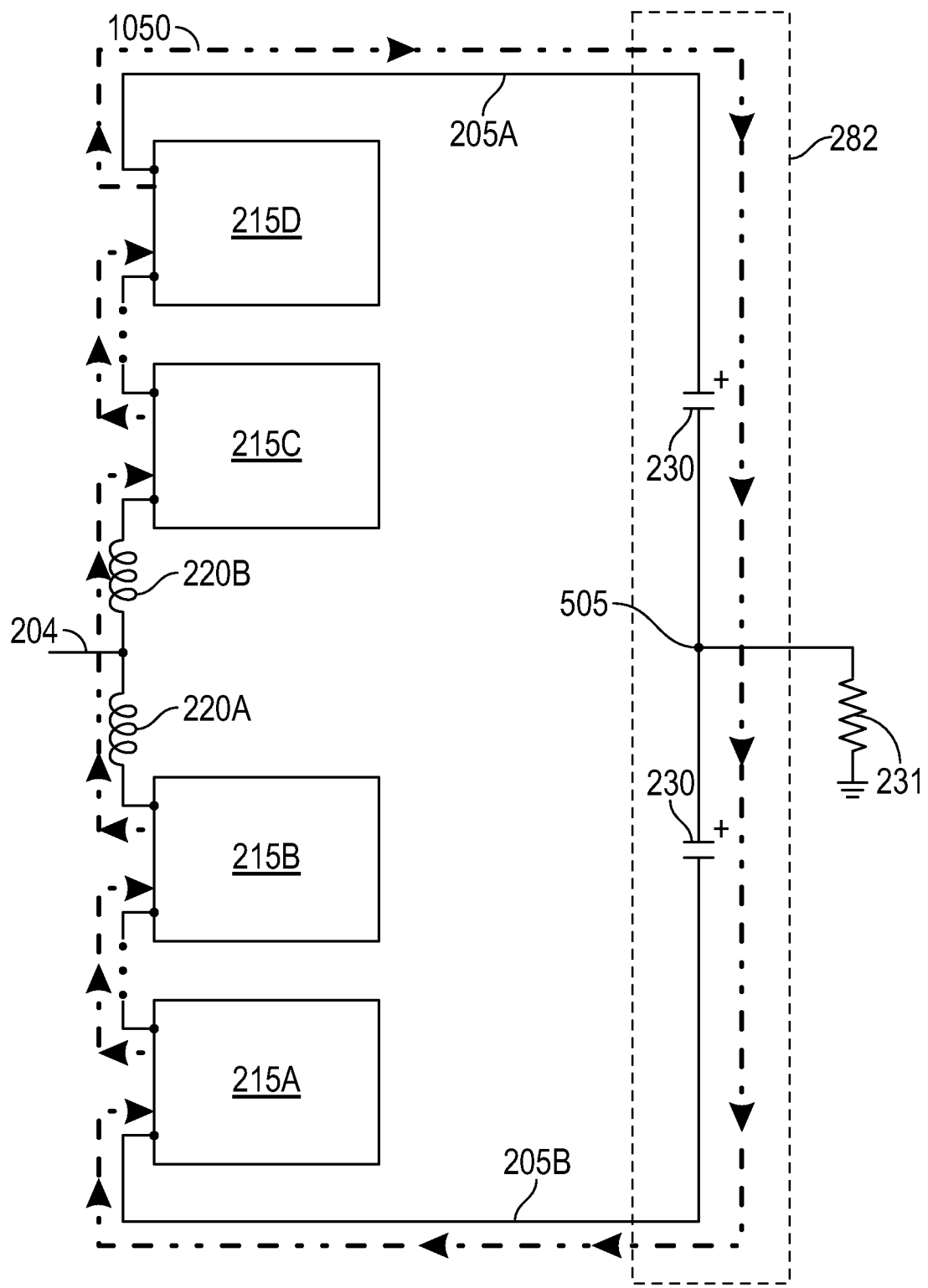
FIG. 10A shows a phase leg discharge loop in a phase leg connected to a DC-link for DC-link capacitors charging or cell-capacitors discharging according to one or more embodiments described in this present disclosure.

Similar to discharge loop 550 illustrated in FIG. 5A, but opposite in direction, FIG. 10A shows the insert discharge loop 1050. Insert discharge loop 1050 is enabled when each MMC cell 215A-215D in the phase leg 500 are configured to have a current path from the dual-cell input 405 to the dual-cell output 406 as illustrated later in FIGS. 10B-10D (e.g., cell current insert discharge paths 1051, 1052, 1053). In some embodiments, the path through each of the MMC cells includes a path through one or more MMC cell capacitors 360. In the insert discharge loop 1050 illustrated in FIG. 10A, current travels in a loop from the lower phase arm via lower DC-link voltage rail 205B through lower phase arm MMC cells 215A and 215B, and through arm inductor 220A from dual-cell input 405 to dual-cell output 406. The loop continues through the upper arm of the phase leg 500, beginning with arm inductor 220B, and continuing on through the upper phase arm MMC cells 215C and 215D with dual-cell output 406 of the last MMC cell in the leg connected to upper DC-link voltage rail 205A (e.g., 215D) which, in turn, is connected to the DC-link 282.

Figure 10D:
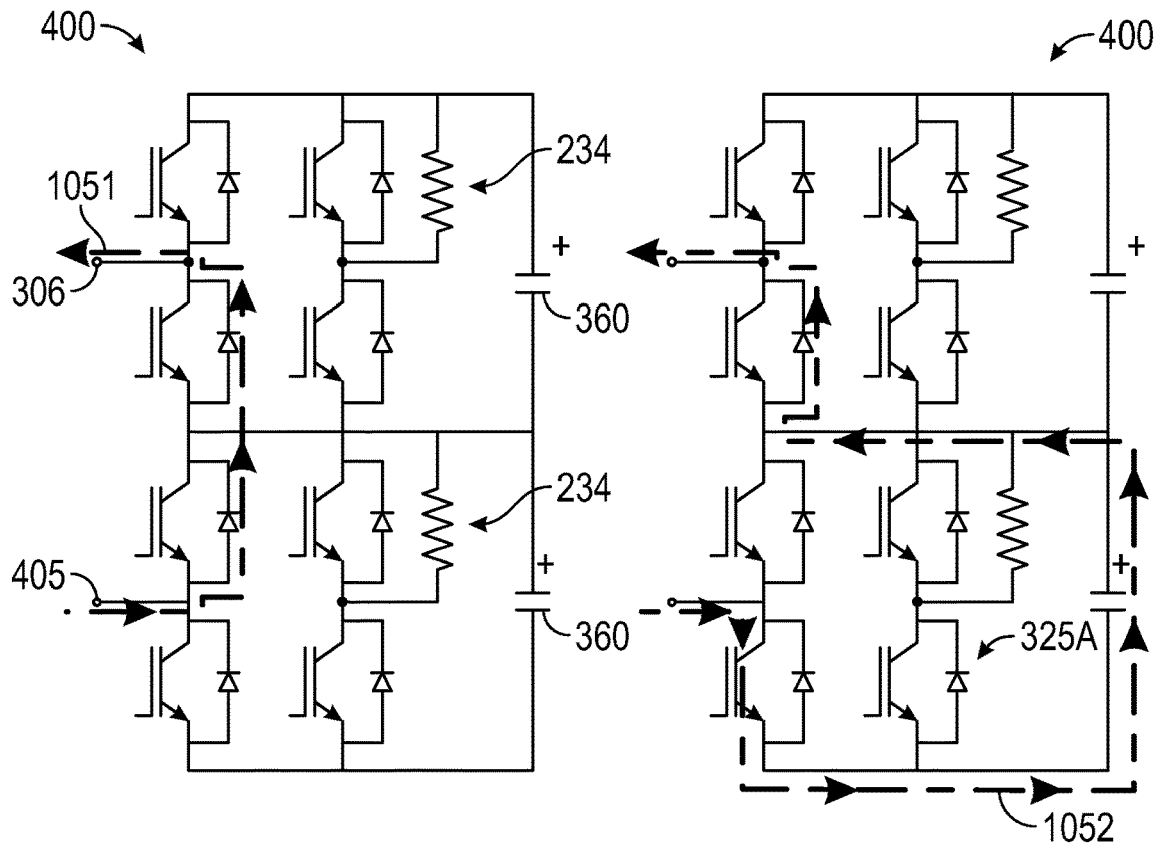
Figure 10D:
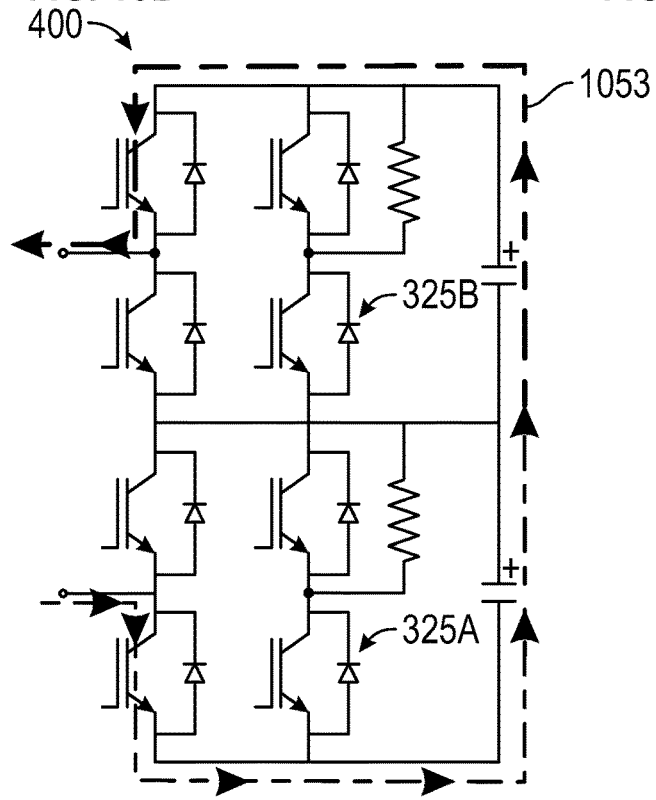

FIGS. 10B-10D show the cell current insert paths for MMC cells 400 for a healthy MMC cell (e.g., discharge path 1051), an MMC cell with one faulty integrated DC chopper 352A (e.g., discharge path 1052), and an MMC cell with two faulty integrated DC choppers 352A and 352B (e.g., discharge path 1053) respectively. Other than identifying the faulty circuit components and their respective discharge paths, FIGS. 10C, 10D are essentially the same to the MMC cell 400 shown in FIG. 10B.

Figure 10E:
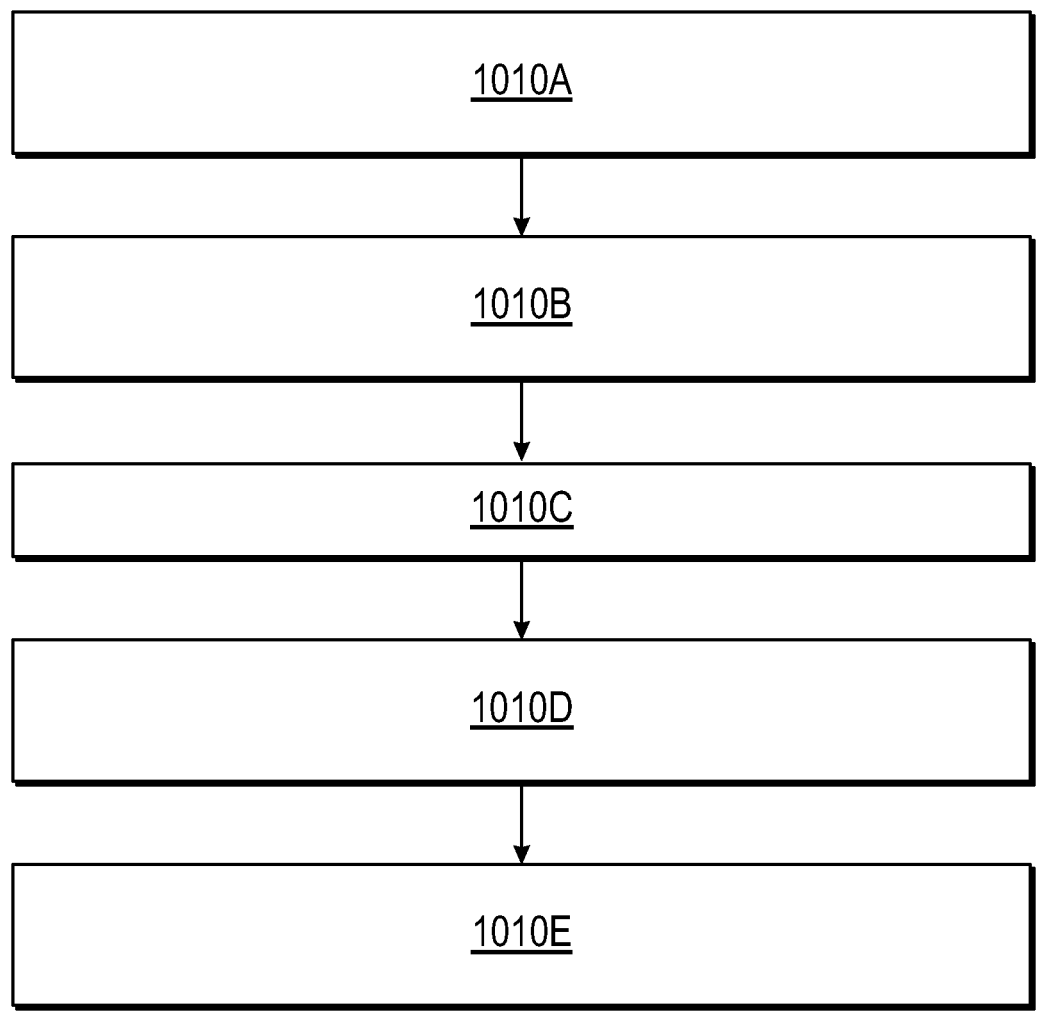
FIG. 10E illustrates a flowchart for de-energizing an MMC system with faulty MMC cells according to one or more embodiments described in this present disclosure.

FIG. 10E is a flowchart 1001 showing category IV de-energization comprising steps in the blocks operating bypass and insert phase leg loops with MMC cells configured according to the type and location of the fault.

In block 1010A, the controller monitors for and detects MMC cell faults in a power converter system 260 having MMC cells 215 with integrated DC choppers.

In block 1010B, the controller identifies MMC cells that contain faulty integrated DC choppers, and/or for MMC cells that comprise more than one integrated DC chopper, and identifies individual faulty integrated DC choppers.

In block 1010C, the controller configures the MMC cells to bypass one or more MMC cell capacitors 360 associated with the faulty integrated DC choppers and engages the bypass switch(es) in MMC cells or portions of cells with non-functioning integrated DC choppers while the insert switches are turned off (e.g., discharge loop 550, FIGS. 9A-C).

In block 1010D, the controller configures the MMC cells to insert one or more MMC cell capacitors associated with the faulty integrated DC choppers and engages the insert switch(es) in MMC cells or portions of cells with non-functioning integrated DC choppers while the bypass switches are turned off (e.g., insert discharge loop 1050, FIGS. 10A-D).

Figure 11A:
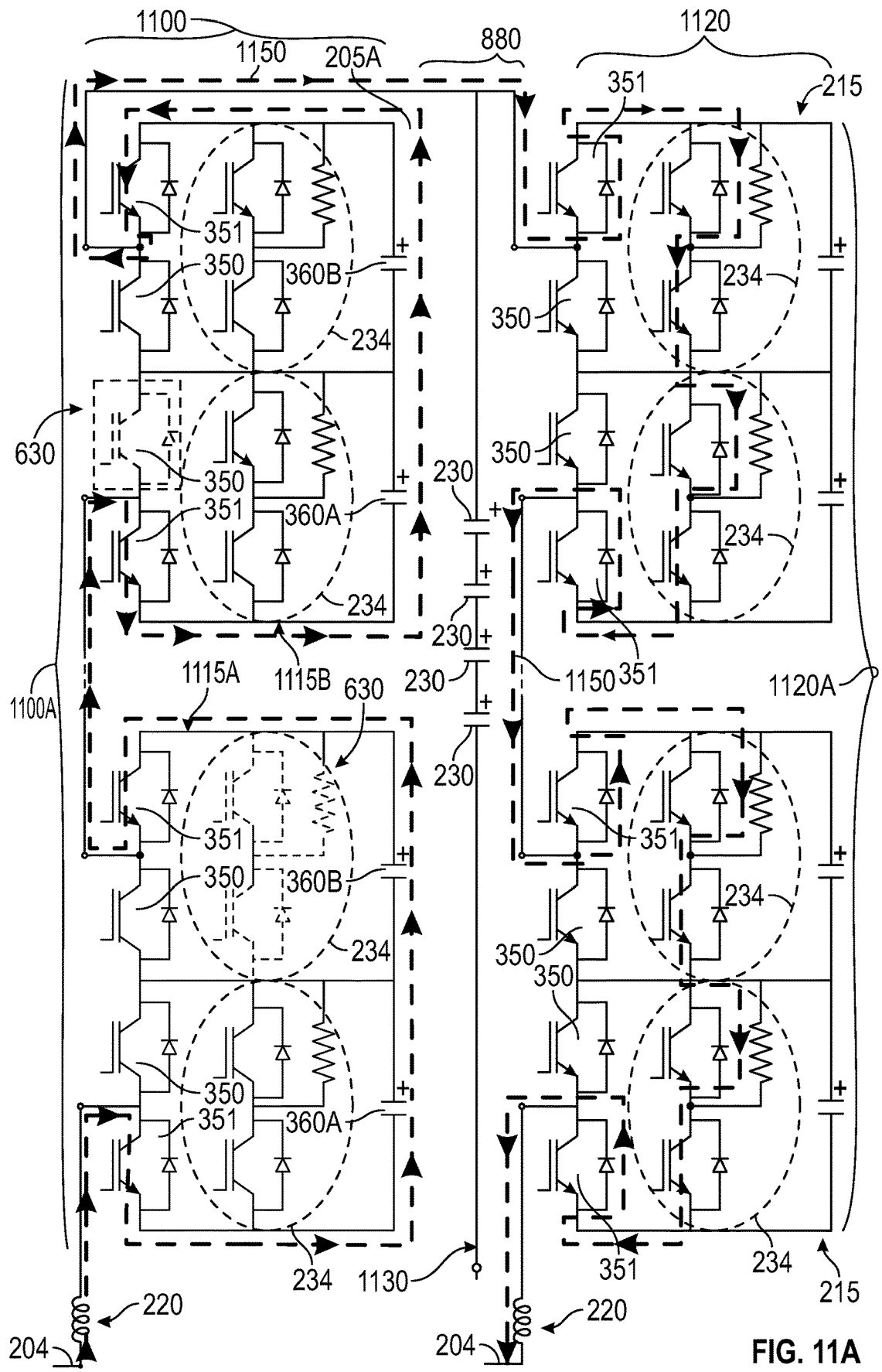
FIG. 11A illustrates discharge loops through faulty MMC cells in a schematic of two MMC phase legs according to one or more embodiments described in this present disclosure.

FIG. 11A shows the upper phase arm 1100A of phase leg 1100 having two MMC cells 400 that are damaged MMC dual cells 1115A, 1115B. Another upper phase arm 1120A of phase leg 1120 is shown connected to phase leg 1100 via upper DC-link voltage rail 205A (top). The lower phase arms 1100B, 1120B of the phase legs 1100, 1120 (together with their connection via lower DC-link voltage rail 205B) are not shown for simplicity of illustration as it can be understood that the lower phase arms for this example mirror the configurations shown in the upper phase arms. Phase leg 1100 is shown having defective or faulty circuit components.

With reference to FIG. 11A, it is possible to discharge the MMC cell capacitors 360A-B in a phase leg 1100 that has MMC dual cells 1115A, 1115B with one or more faulty integrated DC choppers 234 and one or more faulty bypass switches 350, or if there are no DC-link capacitors 230 in the DC-link 880, by using a discharge path that is discharge loop 1150 created in another phase leg 1120. Phase leg 1120 may be chosen from any MMC 200 in the converter system 260 (e.g., LSC 290 or MSC 295 illustrated in FIG. 2B). For this purpose, the insert switches 351 of the MMC cells 1115 whose integrated DC choppers 234 are faulty (or cannot otherwise be operated) are put into conduction in the faulty phase leg 1100 thus placing the MMC cell capacitors 360 of all the MMC cells in the phase arm 1100A in series. A second, preferably healthy, phase leg 1120 is chosen from the other phase legs in converter system 260 to complete the discharge loop 1150. The path in phase leg 1120 can be created by configuring its MMC cells 400 in a number of suitable ways as described above, but in some embodiments, it is configured by the controller 272 according to the discharge loop 302 shown in FIG. 4A where all of the integrated DC choppers 234 in phase leg 1120 are taken into conduction. After this, the insert switches 351 in the cells in phase leg 1100 are taken into conduction, creating a path for these cell capacitors to discharge over the other phase (similar to how the DC-link does as discussed in earlier embodiments), as shown by discharge loop 1150.

Figure 11B:
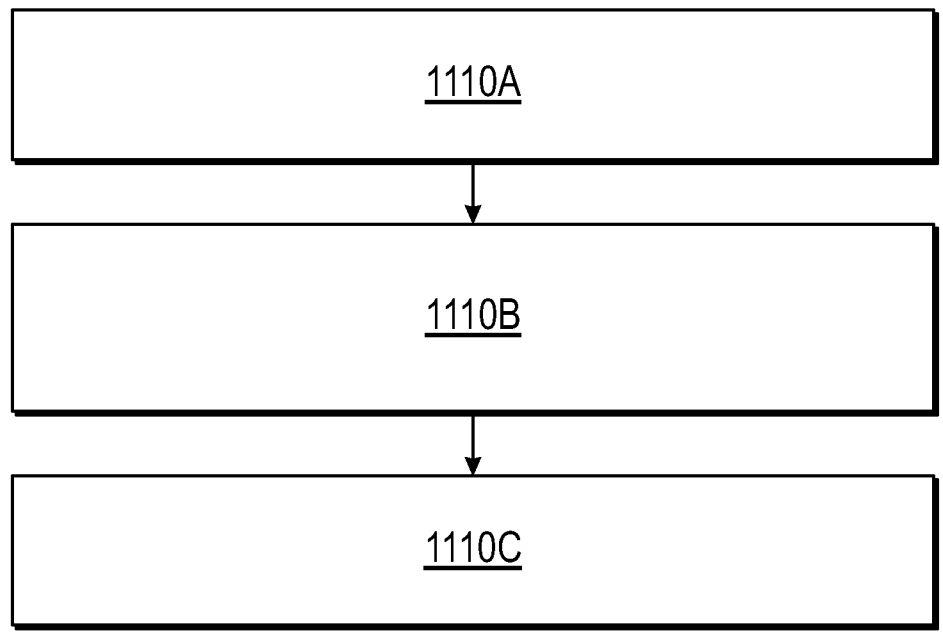
FIG. 11B illustrates a flowchart for de-energizing an MMC system with faulty MMC cells according to one or more embodiments described in this present disclosure.

FIG. 11B shows a flowchart 1101 of the de-energization of MMC cell capacitors 360 in a broken (i.e., faulty) phase leg 1100 by use of a discharge loop through a different phase leg.

In block 1110A, the controller monitors for and detects MMC cell faults in a power converter system having MMC cells with integrated DC choppers. The controller determines the healthiest phase leg and proceeds to operate on the healthiest phase leg as in block 1110B.

The controller may determine that more than one of the phases are equally healthy. In some embodiments, discharge loops for these phase legs are performed contemporaneously.

In block 1110B, the controller configures the main switches within each MMC cell to route current through the integrated DC chopper dump-load resistors or operates the main switches to bypass faulty cells or portions of cells in the healthiest phase leg. See FIG. 11A, discharge loop 1150.

In block 1110C, the controller configures the insert switches for conduction in the unhealthy phase leg. See FIG. 11A (discharge loop 1150 in phase leg 1100).

Herein, reference is made to embodiments of the invention. However, it should be understood that the invention is not limited to specific described embodiments. Instead, any combination of the features and elements discussed above, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the aspects, features, embodiments and advantages herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

The block diagrams in the Figures illustrate the architecture, functionality, and operation of possible implementations of systems, methods and computer program products according to various embodiments of the present invention. In this regard, block diagrams may represent a module, segment, or portion of code, which comprises one or more executable instructions for implementing the specified logical function(s). It will also be noted that each block of the block diagrams, and combinations of blocks in the block diagrams, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

The invention claimed is:

1. A method of controlling a wind turbine modular multilevel converter (MMC) system comprising a plurality of MMC cells connected in series, each of the plurality of MMC cells comprising at least two main switches and an integrated direct current (DC) chopper, the method comprising:
  detecting a system discharge event; and
  controlling the integrated DC choppers to de-energize one or more MMC cell capacitors in each of the plurality of MMC cells in response to the system discharge event.

2. The method of claim 1 wherein controlling the integrated DC choppers comprises:
  enabling a first discharge loop having a current path from a first cell voltage rail, through a dump-load resistor, to a second cell voltage rail, and disabling the current path of the first discharge loop and enabling a free-wheeling loop current through the dump-load resistor and a free-wheeling diode.

3. The method of claim 2 wherein enabling and disabling the first discharge loop comprises controlling a first DC chopper switch.

4. The method of claim 3 wherein the first DC chopper switch is controlled by pulse width modulation (PWM).

5. The method of claim 2 wherein disabling the first discharge loop enables the free-wheeling loop.

6. The method of claim 1 further comprising:
  controlling at least one of the main switches to de-energize the one or more MMC cell capacitors;
  wherein the one or more MMC cell capacitors are connected to the integrated DC chopper by a first cell voltage rail and a second cell voltage rail.

7. The method of claim 6 wherein controlling the integrated DC choppers to de-energize a plurality of MMC cell capacitors comprises:
enabling a first discharge loop having a current path from the first cell voltage rail, through a dump-load resistor, to the second cell voltage rail, and
disabling the first discharge loop current path and enabling a free-wheeling loop current through the dump-load resistor and a free-wheeling diode.

8. The method of claim 6 wherein each of the plurality of cells comprises a cell input and a cell output) connecting the plurality of cells; and wherein the de-energizing comprises configuring at least one of the main switches to block a DC current path short from the cell input to the cell output.

9. The method of claim 8 wherein the main switches are configured to block the DC current path short for each of all the cells in a phase arm.

10. The method of claim 8 wherein the main switches are configured to block the DC current path short for each of all the cells in each of two phase arms of a phase leg.

11. The method of claim 10 wherein the method further comprises:
enabling a second discharge loop having a current path from a first DC-link voltage rail, through the plurality of MMC cells to a second DC-link voltage rail.

12. The method of claim 11 wherein the second discharge loop comprises an earthing resistor.

13. The method of claim 11 wherein the second discharge loop comprises an arm inductor.

14. The method of claim 11 wherein enabling the second discharge loop comprises engaging an earthing switch.

15. The method of claim 11, wherein the method further comprises detecting an MMC cell fault.

16. The method of claim 15 wherein the MMC cell fault comprises a faulty integrated DC chopper.

17. The method of claim 11 wherein blocking the DC current path short from the cell input to the cell output comprises disengaging at least one bypass switch.

18. The method of claim 17 wherein disengaging the at least one bypass switch comprises configuring at least one of two or more main switches.

19. A method of de-energizing a wind turbine MMC system, the MMC system comprising a plurality of series-connected MMC cells, and a DC-link having a first DC-link voltage rail and a second DC-link voltage rail, the method comprising:
enabling a first discharge path from the first DC-link voltage rail, through the plurality of series-connected MMC cells, to the second DC-link voltage rail; and
grounding the second DC-link voltage rail with an earthing resistor;
wherein the first discharge path includes the earthing resistor.

20. A method of de-energizing a wind turbine MMC system, the MMC system comprising a plurality of series-connected MMC cells, and a DC-link having a first DC-link voltage rail and a second DC-link voltage rail, the method comprising:
enabling a first discharge loop having a current path from the first DC-link voltage rail, through the plurality of series-connected MMC cells, to the second DC-link voltage rail; and
enabling a second discharge loop that includes a current path from the first DC-link voltage rail, through a second plurality of series-connected MMC cells, to the second DC-link voltage rail;
wherein the first discharge loop includes MMC cells from a different phase.

* * * * *